United States Patent [19]
Tsutsui

[11] Patent Number: 5,978,372
[45] Date of Patent: Nov. 2, 1999

[54] PRIVATE LINE CONNECTION CONTROLLING METHOD IN FIXED-LENGTH CELL HANDLING-TYPE EXCHANGE AND FIXED-LENGTH CELL HANDLING-TYPE EXCHANGE

[75] Inventor: Nobuyuki Tsutsui, Kawasaki, Japan

[73] Assignee: Fujitsu Limited, Kanagawa, Japan

[21] Appl. No.: 08/803,063

[22] Filed: Feb. 20, 1997

[30] Foreign Application Priority Data

Feb. 26, 1996 [JP] Japan ................................ 8-038407

[51] Int. Cl.[6] .................................................. H04L 12/56
[52] U.S. Cl. ......................... 370/392; 370/399; 370/468
[58] Field of Search .................................. 370/389, 392, 370/395, 396, 397, 398, 399, 409, 410, 468, 477

[56] References Cited

U.S. PATENT DOCUMENTS

| | | | |
|---|---|---|---|
| 5,265,091 | 11/1993 | Van Landegem | 370/397 |
| 5,440,547 | 8/1995 | Esaki et al. | 370/395 |
| 5,440,551 | 8/1995 | Suzuki | 370/395 |
| 5,490,141 | 2/1996 | Lai et al. | 370/397 |
| 5,539,884 | 7/1996 | Robrock, II | 370/399 |
| 5,680,396 | 10/1997 | Moritomo et al. | 370/399 |

*Primary Examiner*—Alpus H. Hsu
*Attorney, Agent, or Firm*—Helfgott & Karas, PC.

[57] ABSTRACT

In a fixed-length cell handling-type exchange, a private line connection is set by automatically reserving a usable path and a necessary band at a designated time. The exchange includes a storage unit which has a connection reservation information storage unit which stores private line connection reservation information and control unit which includes a command reception unit for receiving a command having the private line connection reservation information. A reservation information management unit stores the private line connection reservation information received by the command reception unit into the connection reservation information storage unit of the storage unit. A time information confirming unit confirms the period of the private line connection by referring to the connection reservation information storage unit at constant time intervals. The exchange further includes a private line connection control unit for automatically controlling the setting or canceling of the private line connection between the designated subscriber terminals via an exchange switching unit, based on the private line connection reservation information stored in the connection reservation information storage unit, according to the confirmation result by the time information confirming unit.

52 Claims, 30 Drawing Sheets

FIG. 2

| SERVICE TYPE (CRS, CE) |
|---|
| ORIGINATING SIDE SUBSCRIBER DEVICE'S LOCATION |
| ORIGINATING SIDE SUBSCRIBER'S TELEPHONE NUMBER |
| DESTINATION SIDE SUBSCRIBER DEVICE'S LOCATION |
| DESTINATION SIDE SUBSCRIBER'S TELEPHONE NUMBER |
| ORIGINATING SIDE VPI |
| ORIGINATING SIDE VCI |
| DESTINATION SIDE VPI |
| DESTINATION SIDE VCI |
| USING BAND |
| PVC SET TIME |
| PVC CANCEL TIME |

FIG. 3

| ASSEMBLING F | DEVICE LOCATION |
|---|---|

FIG. 5

521: TIME CONNECTION MANAGEMENT DATA

| PVC SET TIME ||
|---|---|
| PVC CANCEL TIME ||
| TYPE OF DEVICE a | NUMBER OF DEVICE a |
| TYPE OF DEVICE b | NUMBER OF DEVICE b |
| ⋮ ||
| NUMBER OF PATH a ||
| NUMBER OF PATH b ||
| ⋮ ||

FIG. 6

541: BAND DATA

| SET TIME | CANCEL TIME |
|---|---|
| ORIGINATING SIDE VPI | ORIGINATING SIDE VCI |
| DESTINATION SIDE VPI | DESTINATION SIDE VCI |
| USE BAND ||
| ⋮ ||

FIG. 7

531: DEVICE DATA

| DEVICE TYPE | DEVICE NUMBER |
|---|---|
| PVC PRIORITY ||
| UPPER DEVICE TYPE | UPPER DEVICE NUMBER |
| LOWER DEVICE TYPE | LOWER DEVICE NUMBER |
| ⋮ ||

SERVICE TYPE ---------------------- Cell Relay : 1
DEVICE LOCATION OF ORIGINATING ---- 3020320200
SIDE OC3c
DEVICE LOCATION OF DESTINATION ---- 3020330400
SIDE OC3c
ORIGINATING SIDE VPI, VCI --------- 0,127
DESTINATION SIDE VPI, VCI --------- 0,129
USE BAND -------------------------- 140 Mbps
ORIGINATING SIDE SH NUMBER -------- 0
DESTINATION SIDE SH NUMBER -------- 1
DEVICE TYPES ---------------------- 32(SW)
                                    35(MIFSH)
                                    66(OC3c)
HW NUNBER ------------------------- BETWEEN ORIGINATING
                                    SIDE SH AND SW : 0
                                    BETWEEN DESTINATION
                                    SIDE SH AND SW : 4

FIG. 10

| | |
|---|---|
| | 1 |
| 3020320200 | |
| | 0 |
| 3020330400 | |
| | 0 |
| | 0 |
| | 127 |
| | 0 |
| | 129 |
| 140000000 | |
| 09 | 55 |
| 14 | 00 |

FIG. 12

511: PVC CONNECTION RESERVATION DATA

| |
|---|
| 1 |
| 3020320200 |
| 3020330400 |
| 0 |
| 127 |
| 0 |
| 129 |
| 140000000 |

| | |
|---|---|
| 09 | 55 |
| 14 | 00 |

FIG. 17

521: TIME CONNECTION MANAGEMENT DATA

| | |
|---|---|
| 09 | 55 |
| 14 | 00 |
| 66 | 2 |
| 66 | 18 |
| 32 | 0 |
| | 0 |
| | 4 |

FIG. 18

541: BAND DATA

| | |
|---|---|
| 09  55 | 10  00 |
| 0 | 127 |
| 0 | 129 |
| 140000000 ||
| 10  00 | 14  00 |
| 0 | 127 |
| 0 | 129 |
| 140000000 ||

F I G. 19
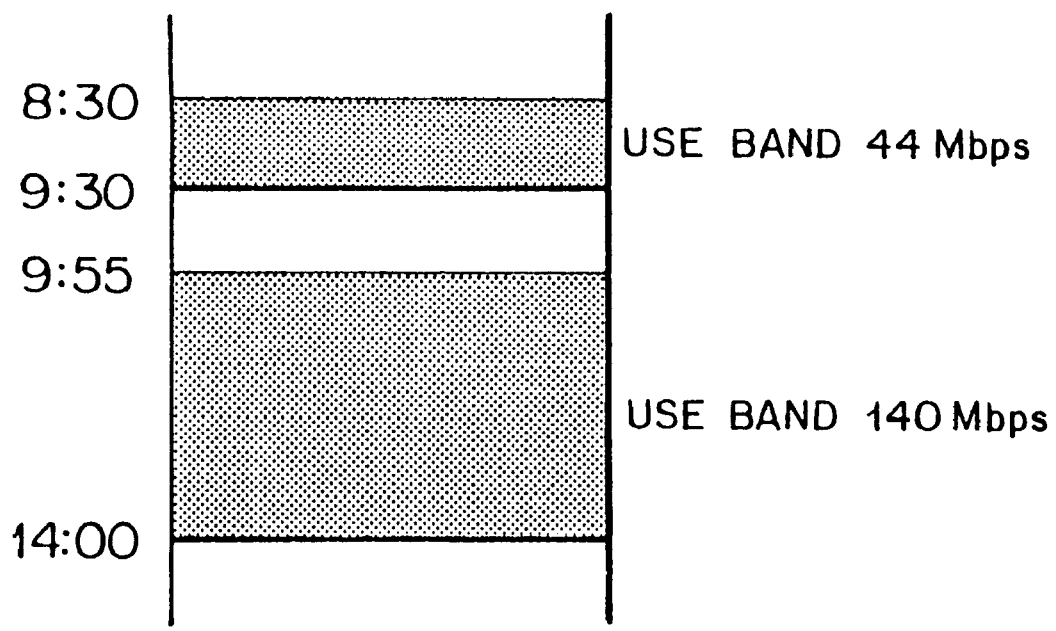

F I G. 28
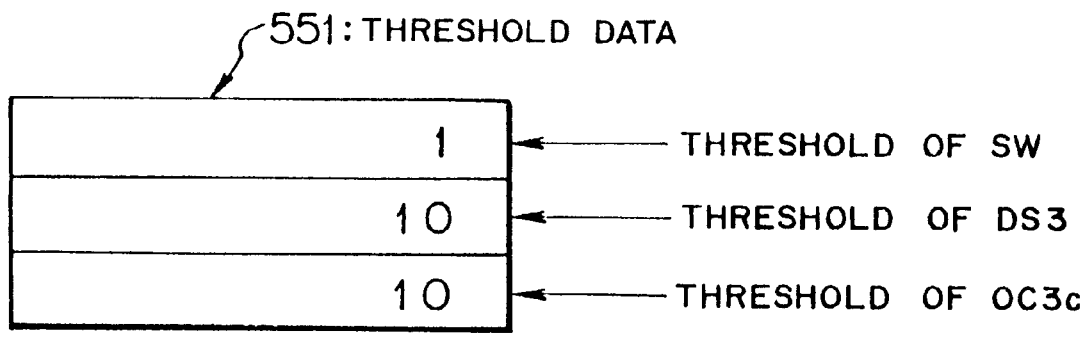

PRIVATE LINE CONNECTION CONTROLLING METHOD IN FIXED-LENGTH CELL HANDLING-TYPE EXCHANGE AND FIXED-LENGTH CELL HANDLING-TYPE EXCHANGE

BACKGROUND OF THE INVENTION

1. Field of the Invention

The present invention relates to a private line connection controlling method in a fixed-length cell handling-type exchange that can set private line connection between specific subscriber terminals (hereinafter referred to as an ATM exchange) and a fixed-length cell handling-type exchange.

2. Related Art

FIG. 29 is a block diagram illustrating the configuration of a general ATM exchange which handles fixed-length cells. As shown in FIG. 29, the ATM (Asynchronous Transfer Mode) exchange 1 accommodates a plurality of subscriber terminals 2 and is mutually connected to other ATM exchanges (other stations) 1A and 1B. The ATM exchange 1 exchanges data between subscriber terminals 2 accommodated in the local station (ATM exchange 1) as well as data between other stations 1A and 1B.

More specifically, the ATM exchange 1 (or 1A, 1B) is generally an exchange that handles cell data with a fixed length (normally, data of 53 bytes formed of a header of 5 bytes and a data part of 48 bytes) called an ATM cell transmitted or received between subscriber terminals 2 (or ATM exchanges 1A, 1B). Each ATM cell can be asynchronously delivered (or exchanged) according to the header added to each ATM cell to transferred sites.

For that reason, the ATM exchange 1 (or 1A, 1B), as shown in FIG. 29, includes usually an ATM switch 3, a main control device (CC) 4 that performs various controls in the ATM exchange 1 (or 1A, 1B) including the ATM switch 3, a main storage device (MM) 5 that holds software for the main control device 4, a line interface device (DS3: Digital Signal Level 3) 6, middle-rate interface shelves (MIFSH) 7, optical line interface devices (OC3c: Optical Carrier 3 concatenated) 8, high-rate interface shelf (HIFSH) 9, and an optical line interface devices (OC12c: Optical Carrier 12 concatenated) 10.

In concrete, the ATM switch 3 selects automatically a transfer route for an ATM cell according to tag information (routing information such as transfer destination address) set in the header of the ATM cell input. Here, the ATM switch 3 has three switch stages 3A to 3C. For example, as shown in FIG. 30, eight switching units 31 for 20 Gbps each that can accommodate eight 2.4 Gbps lines are arranged in the first switch stage 3A. Four switching units 32 for 40 Gbps each that can accommodate sixteen 2.4 Gbps lines are arranged in the second switch stage 3B. Eight switching units 31 for 20 Gbps are arranged in the third switch stage 3C, like the first switch stage.

In such a configuration, in the ATM switch 3, the tag information set in a binary form within the header of an input ATM cell is sequentially read bit by bit by means of the switching units 31 and 32 in each of the switching stages 3A to 3C. Then the ATM cell transfer route is automatically selected by repeating a selecting operation of "1" or "0".

The line interface device (DS3) 6, the middle-rate interface shelves (MIFSH) 7, the optical line interface devices (OC3c) 8, the high-rate interface shelf (HIFSH) 9, and the optical line interface devices (OC12c) 10 standardize each line rate to the ATM switch 3 to 2.4 Gbps because the line rate in the ATM switch 3 is 2.4 Gbps, as described above.

For example, if it is assumed that the line interface device (DS3) 6 (or the optical line interface device (OC3c) 8) is an interface that can accommodate lines corresponding to about 155 Mbps and that the middle-rate interface shelf (MIFSH) 7 is an interface that can accommodate lines corresponding to about 2.4 Gbps, and that the line rate between subscriber terminals 2 and the ATM switch 3 is about 44 Mbps, the line interface device (DS3) 6 (or the optical line interface device (OC3c)8) accommodates three lines (44 Mbps×3). Further, as shown in FIG. 31, each line rate to the ATM switch 3 can be standardized to about 2.4 Gbps by accommodating sixteen lines (155 Mbps×16) in the middle-rate interface shelf (MIFSH) 7.

In contrast, the optical line interface device (OC12c) 10 is an interface that can accommodate lines corresponding to about 622 Mps. The high-rate interface shelf (HIFSH) 9 is an interface that can accommodate lines corresponding to about 2.4 Gbps. In this case, when the line rate between the subscriber terminals 2 and the ATM switch 3 is about 44 Mbps, each line rate to the ATM switch 3 can be standardized to about 2.4 Gbps by accommodating twelve 44 Mbps-lines (44M bps×12) in the optical line interface device (OC12c) 10 and accommodating four lines (622 Mbps×4) in the high-rate interface shelf (HIFSH) 9, as shown in FIG. 32.

That is, the ATM exchange 1 can perform a high-rate exchange process to the low-rate ATM cells by multiplexing a predetermined number of ATM cells from each subscriber terminal 2 or other stations 1A and 1B in each interface thereof and then standardizing and converting the transfer rate of all the ATM cells input to the ATM switch 3 (lines accommodated in the ATM switch 3) into a high transfer rate of 2.4 Gbps.

The other ATM exchanges 1A and 1B have the configuration equivalent to that of the ATM exchange 1. However, they use different interfaces according to the transfer rate of an ATM cell handled (the transmission rate of an accommodated line). For example, as shown in FIG. 29, the other exchange 1A uses an optical line interface device (OC3c) 8 and a middle-rate interface shelf (MIFSH) 7 to accommodate the middle-rate (155 Mbps) line while the other exchange 1B uses a high-rate interface shelf (HIFSH) 9 and an optical line interface device (OC12c) 10 to accommodate the high-rate (622 Mbps) channel.

When accommodating only middle-rate (155 Mbps) channel, the ATM exchanges 1, 1A or 1B, for example, as shown in FIG. 33, uses only the optical line interface devices (OC3c) 8 and the middle-rate interface shelves (MIFSH) 7, whereby they are mutually connected via the interfaces.

In FIG. 29, numeral 11 represents an Ethernet control device (ETC). Numeral 12 represents a maintenance and operation management control device (OMP). The Ethernet control device 11 controls a device connected to the Ethernet network 13. The maintenance and operation management control device 12 informs the Ethernet control device 11 in response to a maintenance and operation command from a maintenance personnel) operator of the ATM exchange 1. As shown in FIG. 29, various controls such as operation and maintenance of the ATM exchange 1 are performed via the Ethernet network by connecting the main control device 4 in the ATM exchange 1 via the Ethernet control device 11 and the Ethernet network 13.

As an example of such a control, for example, it may be considered that a private line (PVC: Permanent Virtual Channel) connection is set between subscriber terminals 2 accommodated in the ATM exchange 1. First, the operator of the ATM exchange 1 issues the connection request command 14 of a PVC having the format, e.g. shown in FIG. 34, from the maintenance and operation management control device 12 to the main control device 4 of the ATM exchange 1 via the Ethernet control device 11 and the Ethernet network 13 at a PVC path setting time.

The PVC connection request command 14 stores various kinds of information including service type (PVC connection), the location of each subscriber terminal 2 on an originating side/destination side, telephone number of each subscriber terminal 2 of an originating side/destination side, a virtual route identifier (VPI: Virtual Route Identifier) of an originating side/destination side, and a virtual channel identifier (VCI: Virtual Channel Identifier) of an originating side/destination side and the like.

When receiving the PVC connection request command 14, the main control device 4 analyzes main information contained in the command 14 and then informs the interface shelf 7 or 9 of routing information regarding the path on which a PVC is set based on VPI and VCI, via the ATM switch 3. Thus, the cell transfer route is fixed by rewriting tag information on an ATM cell passing the ATM switch 3 so that a PVC path using a path designated with VPI and VCI is set between the corresponding subscriber terminals 2.

However, in the ATM exchange 1 described above, since the PVC path connection can be achieved (set) only when an operator inputs a PVC connection request command, an operator which operates the maintenance and operation management control device 12 must be stationed all the time at a PVC path setting time in, for example, nighttime and holidays.

When an operator inputs a PVC connection request command, the PVC route cannot be set if the band of a route designated by the VPI and VCI is not left more than a using band.

SUMMARY OF THE INVENTION

It is an object of the present invention to eliminate the above problems and to provide a private line connection controlling method in a fixed-length cell handling-type exchange that can set a PVC route (private line connection) by automatically reserving a device, route and necessary band usable in a designated time, and a fixed-length cell handling-type exchange.

This and other objects of the present invention are attained by a private line connection controlling method in a fixed-length cell handling-type exchange which includes an exchange switching unit that accommodates a plurality of subscriber terminals and a control unit for the exchange switching unit and is capable of setting a private line connection between specific subscriber terminals under the control of the control unit, the private line connection controlling method comprising the steps of receiving a command having private line connection reservation information designating subscriber terminals to which the private line connection is to be set and a period of the private line connection to be set between the subscriber terminals, and automatically setting by the control unit the private line connection between the designated subscriber terminals during the period based on the private line connection reservation information.

In the private line connection controlling method in a fixed-length cell handling-type exchange according to the present invention, the period may be designated by a set start time and a set end time for the private line connection.

Further, in the private line connection controlling method in a fixed-length cell handling-type exchange according to the present invention the period may be designated by a set start time for the private line connection and an elapsed time from the set start time.

In an embodiment, the private line connection controlling method in the fixed-length cell handling-type exchange, including an exchange switching unit that accommodates a plurality of subscriber terminals and a control unit for the exchange switching unit and being capable of setting a private line connection between specific subscriber terminals under the control of the control unit, the private line connection controlling method comprises the steps of receiving a command having private line connection reservation information designating subscriber terminals from which already-set private line connection is to be set and either a set end time for the private line connection set between the subscriber terminals or an elapsed time from a set start time of said private line connection, and automatically canceling by the control unit the private line connection set between the designated subscriber terminals at the set end time or after the elapsed time based on the private line connection reservation information.

Thus, the private line connection may be set or canceled between the designated subscriber terminals on the basis of the private line connection reservation information.

In another embodiment, the private line connection controlling method in a fixed-length cell handling-type exchange having an exchange switching unit that accommodates a plurality of subscriber terminals and a control unit for the exchange switching unit and being capable of setting a private line connection between specific subscriber terminals under the control of the control unit, comprises the steps of receiving a command having private line connection reservation information designating subscriber terminals to which the private line connection is to be set, a period of the private line connection to be set between the subscriber terminals, and a using band at the time of setting the private line connection, determining by the control unit a usable route as the private line connection between the designated subscriber terminals, based on the private line connection reservation information, and automatically setting by the control unit the private line connection using the determined route and a using band between the designated subscriber terminals during the period based on the private line connection reservation information via the exchange switching unit at the start time of the period.

The control unit may select arbitrarily a route between the designated subscriber terminals, judges whether or not there is a use reservation for another private line connection to the selected route based on the private line connection reservation information, and decides the selected route as the usable route if there is no other use reservation.

In the private line connection controlling method in a fixed-length cell handling-type exchange of yet another embodiment of the present invention, the control unit selects arbitrarily a route between the designated subscriber terminals, judges whether or not there is a use reservation for another private line connection to the selected route, then judges whether or not a usable band in the period of the selected route is left equal to or larger than the using band if there is another use reservation, based on the private line connection reservation information, and decides the selected route as the usable route if the usable band is left equal to or larger than the using band.

The private line connection controlling method in a fixed-length cell handing-type exchange according to the present invention may further comprise the steps of selecting a route other than the selected route when the usable band of the selected route in the period is less than the using band and then trying process for deciding the usable route again.

In the private line connection controlling method in a fixed-length cell handing-type exchange according to the present invention the step may be provided by automatically canceling the private line connection set via the exchange switching unit when the end time of the period comes, based on the private line connection reservation information.

In the private line connection controlling method in a fixed-length cell handling-type exchange which further has a storage unit that stores the private line connection reservation information, the control unit may delete the corresponding private line connection reservation information from the storage unit when the private line connection is canceled.

In a further embodiment, the private line connection controlling method in a fixed-length cell handling-type exchange which has an exchange switching unit that accommodates a plurality of subscriber terminals via a plurality of interface units and a control unit for the plurality of interface units and the exchange switching unit and which is capable of setting a private line connection between specific subscriber terminals under the control of the control unit, comprises the steps of receiving a command having private line connection reservation information designating subscriber terminals to which the private line connection is to be set, a period of the private line connection to be set between the subscriber terminals, and a using band at the private line connection setting time, deciding by the control unit a usable interface unit and a usable path as the private line connection between the designated subscriber terminals, based on the private line connection reservation information, and then automatically setting the private line connection using the usable interface unit, path and the using band between the designated subscriber terminals via the exchange switching unit when the start time of the period comes.

The control unit may arbitrarily select an interface unit and path between the designated subscriber terminals, judges whether or not there is a use reservation to set another private line connection to the selected interface unit and the selected path, based on the private line connection reservation information, and decides the selected interface unit as the usable interface and the selected path as the usable path if there are no other use reservations.

Further, in an embodiment the control unit selects arbitrarily an interface unit and a path between the designated subscriber terminals, judges whether or not there is a use reservation for another private line connection to the selected interface unit and the selected path, further decides whether or not the usable band in the period of the selected interface unit and the selected path is left equal to or larger than the using band when there is another use reservation, based on the private line connection reservation information, and decides the selected interface unit as the usable interface unit and the selected path as the usable path if the usable band is left equal to or larger than the using band.

The method may further comprise the steps of selecting an interface unit other than the selected interface unit and a path other than the selected path when the usable band of the selected interface unit and the usable band of the selected path in the period is less than the using band and then trying process for deciding the usable interface unit and the usable path again.

The control unit may cancel automatically the private line connection via the exchange switching unit based on the private line connection reservation information when the end time of the period comes.

In the fixed-length cell handling-type exchange which has an exchange switching unit that accommodates a plurality of subscriber terminals via a plurality of interface units and a control unit for the plurality of interface units and the exchange switching unit and which is capable of setting a private line connection between specific subscriber terminals under the control of the control unit, the private line connection controlling method comprises the steps of receiving a command having priority information setting a route to be preferentially used at the time of setting the private line connection, setting by the control unit priority information to the route and then setting the private line connection using the priority route to which the priority information has been set, when the private line connection is set between certain subscriber terminals.

The method may comprise the steps of receiving a command having private line connection reservation information designating subscriber terminals to which the private line connection is to be set, a period of the private line connection to be set between the subscriber terminals and a using band at the time of setting the private line connection, selecting by the control unit the priority route where the band in the period is left equal to or larger than the using band, based on the private line connection reservation information, and then automatically setting by the control unit the private line connection using the priority route and the using band between the designated subscriber terminals when the set start time of the period comes.

The control unit may cancel automatically the private line connection using the priority route and the using band, based on the private line connection reservation information, when the end time of the period comes.

The control unit may judge whether or not there is another use reservation in the band of the priority route when the private line connection is canceled, not cancel the priority information set to the priority route if there is another use reservation, and cancel the priority information set to the priority route if there are no other use reservations.

An upper limit value may be set to the number of priority routes to which the priority information can be set, and the control unit then sets the priority information such that the number of the priority routes is equal to or smaller than the upper limit value.

The private line connection controlling method may comprise the steps of receiving a command having priority information setting a route to be preferentially used at the time of setting the private line connection, setting by the control unit the priority information to the route, and inhibiting to use the priority route on which the priority information is set when the public line connection is set.

The private line connection controlling method may comprise the steps of receiving a command having private line connection reservation information designating subscriber terminals to which the private line connection is to be set, a period of the private line connection to be set between the subscriber terminals and a using band at the private line connection setting time, deciding by the control unit a route in which the band in the period is left equal to or larger than the using band as usable route to set the private line connection between the designated subscriber terminals, based on the private line connection reservation information, and then setting the decided route as a priority route to be preferentially used at the time of setting the private line connection, and automatically setting the private line connection using the priority route and the using band between the designated subscriber terminals via the exchange switching unit when the start time of the period comes.

The control unit may cancel automatically the private line connection using the priority route and the using band, based on the private line connection reservation information, when the end time of the period comes.

The control unit may judge whether or not there is another use reservation in the band of the priority route when the private line connection is canceled, not cancel the priority information set to the priority route if there is another use reservation, and cancel the priority information set to the priority route if there is no other use reservation.

In yet another example, the private line connection controlling method may comprise the steps of receiving a command having private line connection reservation information designating subscriber terminals to which the private line connection is to be set, a period of the private line connection to be set between the subscriber terminals and a using band at the private line connection setting time, the control unit decides a route in which the band in the period is left equal to or larger than the using band as a usable route to set the private line connection between the designated subscriber terminals, based on the private line connection reservation information, sets priority information for a priority route to be preferentially used at the time of setting the private line connection to the decided route; and inhibits to use the priority route when the public line connection is set.

A fixed-length cell handling-type exchange of the present invention comprises a storage unit which includes a reservation information storage unit that stores private line connection reservation information designating subscriber terminals that control the setting or canceling of said private line connection and a period of the private line connection to be set between the subscriber terminals, and a control unit which includes a command reception unit for receiving a command having the private line connection reservation information, a reservation information management unit for storing the private line connection reservation information received by the command reception unit into the reservation information storage unit of the storage unit, a time information confirming unit for confirming the period by referring to the reservation information storage unit at constant time intervals, and a private line connection control unit for controlling automatically the setting/canceling of the private line connection between the designated subscriber terminals via the exchange switching unit, based on the private line connection reservation information stored in the reservation information storage unit, according to the confirmation result of the period by the time information confirming unit.

The private line connection control unit sets automatically the private line connection between the designated subscriber terminals via the exchange switching unit, based on the private line connection reservation information in the reservation information storage unit, when the time information confirming unit confirms the start time of the period, and then cancels automatically the private line connection set between the designated subscriber terminals via the exchange switching unit, based on said private line connection reservation information in the reservation information storage unit, when the time information confirming unit confirms the end time of the period.

In an embodiment, the storage unit includes a reservation information storage unit that stores private line connection reservation information designating subscriber terminals to which the private line connection is to be set, a period of the private line connection to be set between the subscriber terminals, and a using band used at the time of setting the private line connection, a route information storage unit for storing route information on usable routes in the period of the private line connection, and a band information storage unit for storing using band information regarding usable routes in the period of the private line connection; and that the control unit includes a command reception unit for receiving a command having the private line connection reservation information, a reservation information storage unit for storing the private line connection reservation information received by the command reception unit into the reservation information storage unit of the storage unit, a route deciding unit for deciding a usable route between the designated subscriber terminals in the period, based on the private line connection reservation information stored in the reservation information storage unit, a route information management unit for storing the route information on the route decided by the route deciding unit into the route information storage unit, together with the period, a band information management unit for storing using band information on the route decided by the route deciding unit into the band information storage unit, together with the period, a time information confirming unit for confirming the period by referring to the route information storage unit at constant time intervals, and a private line connection control unit for setting automatically the private line connection using the route decided by the route deciding unit and the using band between the designated subscriber terminals via the exchange switching unit, when the time information confirming unit confirms the start time of the period.

The route deciding unit may comprise a route selecting unit for arbitrarily selecting a route between the designated subscriber terminals based on the private line connection reservation information stored in the reservation information storage unit of the storage unit; a reservation status judgment unit for judging whether or not there is already a use reservation for another private line connection in the selected route selected by the route selecting unit, based on the route information stored in the route information storage unit; and a remaining band judgment unit for judging whether or not the band in the period of the selected route selected in the route selecting unit is left equal to or larger than the using band based on the band information stored in the band information storage unit; the selected route being decided as a route usable at the time of setting the private line connection when the reservation status judgment unit judges that there is no use reservation for another private line connection in the selected route or that there is a use reservation for another private line connection in the selected route and the remaining band judgment unit judges that there is a band in the period of the selected route is left equal to or larger than the using band.

The route deciding unit may decide a usable route to set the private line connection by selecting a route other than the selected route when the remaining band judgment unit judges that the band of the period of the selected route is left equal to or larger than the using band.

The private line connection control unit may cancel automatically the set private line connection via the exchange switching unit when the time information confirming unit confirms the end time of the period; and the reservation information management unit may delete the corresponding private line connection reservation information in the reservation information storage unit of the storage unit when the private line connection control unit cancels the private line connection.

In an embodiment, the exchange has the storage unit which includes a reservation information storage unit that stores private line connection reservation information designating subscriber terminals to which the private line connection is to be set, a period of the private line connection to be set between the subscriber terminals, and a using band used at the time of setting the private line connection, an identification information storage unit for storing identification information inherent regarding a usable interface unit and path in the period of the private line connection, and a band information storage unit for storing using band information regarding a usable interface unit and path in the period of the private line connection; and the control unit which includes a command reception unit for receiving a command having the private line connection reservation information, a reservation information management unit for storing the private line connection reservation information received by the command reception unit into the reservation information storage unit of the storage unit, an interface unit and path deciding unit for deciding a usable interface unit and path when the private line connection is set between the designated subscriber terminals, based on the private line connection reservation information stored in the reservation information storage unit, an interface unit and path information management unit for storing inherent identification information on the interface unit and path decided by the interface unit and path deciding unit, into the identification information storage unit, together with the period, a band information management unit for storing using band information on the interface unit and path decided by the interface unit and path deciding unit, into the band information storage unit, together with the period, a reservation information confirming unit for confirming the period by referring to the identification information storage unit at constant time intervals, and a private line connection control unit for setting automatically a private line connection using the interface unit and path decided by the interface unit and path deciding unit between the designated subscriber terminals via the exchange switching unit, when the reservation information confirming unit confirms the start time of the period.

The interface unit and path deciding unit may comprise an interface unit and path selecting unit for arbitrarily selecting an interface unit and path between the designated subscriber terminals based on the private line connection reservation information stored by the reservation information storage unit of the storage unit; a reservation status judgment unit for judging whether or not there is already use reservation for another private line connection in the interface unit and path selected by the interface unit and path selecting unit, based on the identification information stored in the identification information storage unit; and a remaining band judgment unit for judging whether or not the band in the period of the interface unit and path selected in the interface unit and path selecting unit is left equal to or larger than the using band, based on the band information stored in the band information storage unit; the selected interface unit and the selected path being decided as a usable interface unit and path at the time of setting the private line connection when the reservation status judgment unit judges that there is no use reservation for another private line connection in the selected interface unit and the selected path or that there is a use reservation for another private line connection in the selected interface unit and the selected path, and the remaining band judgment unit judges that a band in the period of the selected interface unit and the selected path is left equal to or larger than the using band.

The interface unit and path deciding unit may decide an interface unit and a path which are usable at the private line connection setting time by selecting an interface unit and path other than the selected interface unit and the selected path when the remaining band judgment unit judges that the band of each of the selected interface unit and the selected path is less than the using band.

In an embodiment, the private line connection control unit cancels automatically the set private line connection via the exchange switching unit when the time information confirming unit confirms the end time of the period and that the reservation information management unit deletes corresponding private line connection reservation information in the reservation information storage unit of the storage unit when the private line connection control unit cancels the private line connection.

The storage unit may include a priority information storage unit for storing priority information setting a route to be used preferentially at the time of setting the private line connection; and the control unit may include a priority command reception unit for receiving a priority command having the priority information, a priority information management unit for setting the priority information to the route based on the priority information received by the priority command reception unit and storing the priority route information on the priority route to which the priority information is set, into the priority information storage unit of the storage unit, and a private line connection control unit for setting the private line connection using the priority route, based on the priority route information in the priority information storage unit, when the private line connection is established between certain subscriber terminals.

The priority information management unit includes a reservation band judgment unit for judging whether or not there are other use reservations for the band of the priority route when the setting of the private line connection using the priority route is canceled, the priority information management unit not canceling the priority information set to the priority route when the reservation band judgment unit judges that there are other use reservations for the band of the priority route while canceling the priority information set to the priority route when the reservation band judgment unit judges that there are no other use reservations for the band of the priority route.

The storage unit may include an upper limit value storage unit that stores the upper limit value of the number of priority routes to which the priority information can be set, and that the priority information management unit sets the priority information so as to set the number of the priority routes to equal to or smaller than the upper limit value.

The storage unit may include a priority information storage unit for storing priority information setting a route to be used preferentially at the time of setting the private line connection; a reservation information storage unit for storing private line connection reservation information designating subscriber terminals to which the private line connection is to be set, a period of the private line connection to be set between the subscriber terminals, and a using band used at the time of setting the private line connection; a route information storage unit for storing route information on a route usable in the period of the private line connection; and a band information storage unit for storing using band information on a route usable in the period of the private line connection; and the control unit may include a priority command reception unit for receiving a priority command having the priority information, a priority information management unit for setting the priority information to the route based on the priority information received by the priority command reception unit and for storing the priority route information on the priority route and the priority information into the priority information storage unit of the storage unit, a reservation command reception unit for receiving a reservation command having the private line connection reservation information, a reservation information management unit for storing the private line connection reservation information received by the reservation command reception unit into the reservation information storage unit of the storage unit, a route deciding unit for deciding the priority route in which the band in the period is left equal to or larger than the using band, based on the private line connection reservation information in the reservation information storage unit and the priority information in the priority information storage unit, as a route usable at the time of setting the private line connection, a route information management unit for storing route information regarding the priority route decided by the route deciding unit into the route information storage unit, together with the period, a band information management unit for storing using band information on the priority route decided by the priority route deciding unit into the band information storage unit, together with the period, a time information confirming unit for confirming the period by referring to the route information storage unit at constant time intervals, and a private line connection control unit for automatically setting the private line connection using the priority route and the using band between the designated subscriber terminals when the time information confirming unit confirms the start time of the period.

The private line connection control unit may cancel automatically the setting of the private line connection when the time information confirming unit confirms the end time of the period. The priority information management unit may include a reservation band judgment unit that judges whether or not there are other use reservations in the band of the priority route when the setting of the private line connection using the priority route is canceled and that the priority information management unit does not cancel the priority information set to the priority route when the reservation band judgment unit judges that there are other use reservations in the band of the priority route or cancels the priority information set to the priority route when the reservation band judgment unit judges that there are no other use reservations in the band of the priority route.

In an embodiment, the storage unit includes an upper limit value storage unit that stores the upper limit value of the number of priority routes to which the priority information can be set, and that the priority information management unit sets the priority information so as to set the number of the priority routes to equal to or smaller than the upper limit value.

In yet another embodiment, the storage unit includes a priority information storage unit for storing priority information setting a route to be used preferentially at the time of setting the private line connection; a reservation information storage unit for storing private line connection reservation information designating subscriber terminals to which the private line connection is to be set, a period of the private line connection to be set between the subscriber terminals, and a using band used at the time of setting the private line connection; a route information storage unit for storing route information on a route usable in the period of the private line connection; and a band information storage unit for storing using band information on a route usable in the period of the private line connection; and that the control unit includes a public line connection setting command reception unit for receiving a public line connection setting command to set the public line connection, a priority command reception unit for receiving a priority command having the priority information, a priority information management unit for setting the priority information to the route based on the priority information received by the priority command reception unit and storing the priority route information on the priority route and the priority information into the priority information storage unit of the storage unit, a reservation command reception unit for receiving a reservation command having the private line connection reservation information, a reservation information management unit for storing the private line connection reservation information received by the reservation command reception unit into the reservation information storage unit of the storage unit, a route deciding unit for deciding the priority route in which the band in the period is left equal to or larger than the using band, based on the private line connection reservation information in the reservation information storage unit and the priority information in the priority information storage unit, as a route usable at the time of setting the private line connection, a route information management unit for storing route information on the priority route decided by the route deciding unit into the route information storage unit, together with the period, a band information management unit for storing using band information on the priority route decided by the priority route deciding unit into the band information storage unit, together with the period, a time information confirming unit for confirming the period by referring to the route information storage unit at constant time intervals, and a private line connection control unit for setting automatically the private line connection using the priority route and the using band between the designated subscriber terminals when the time information confirming unit confirms the start time of the period; the private line connection control unit setting the public line connection between certain subscriber terminals without using the priority route, based on the priority route information in the priority information storage unit, when the public line connection setting command reception unit receives the public line connection setting command.

The storage unit may include a priority information storage unit for storing priority information setting a route to be used preferentially at the time of setting the private line connection; a reservation information storage unit for storing private line connection reservation information designating subscriber terminals to which the private line connection is to be set, the period of the private line connection to be set between the subscriber terminals, and a using band used at the time of setting the private line connection; a route information storage unit for storing route information on a route usable in the period of the private line connection; and a band information storage unit for storing using band information on a route usable in the period of the private line connection; and the control unit may include a reservation command reception unit for receiving a reservation command having the private line connection reservation information, a reservation information management unit for storing the private line connection reservation information received by the reservation command reception unit into the reservation information storage unit of the storage unit, a route deciding unit for deciding a route between the designated subscriber terminals usable in the period, based on the private line connection reservation information in the reservation information storage unit, a priority information management unit for setting the priority information to the route decided by the route deciding unit and storing route information on the route and the priority information into the priority information storage unit in the storage unit, a route information management unit for storing route information on a priority route to which the priority information is set by the priority information management unit, into the route information storage unit of the storage unit, together with the period, a band information management unit for storing using band information on the priority route into the band information storage unit of the storage unit, together with the period, a time information confirming unit for confirming the period by referring to the route information storage unit at constant time intervals, and a private line connection control unit for setting automatically a private line connection using the priority route and the using band between the designated subscriber terminals via the exchange switching unit when the time information confirming unit confirms the start time of the period.

The private line connection control unit may cancel automatically the setting of the private line connection using the priority route and the using band when the reservation information confirming unit confirms the end time of the period.

The priority information management unit may include a reservation band judgment unit that judges whether or not there are other use reservations for the band of the priority route when the reservation information confirming unit confirms the end time of the period and the private line connection using the priority route and the using band is canceled; the priority information management unit not canceling the priority information set to the priority route when the reservation band judgment unit judges that there are other use reservations for the band of the priority route or canceling the priority information set to the priority route when the reservation band judgment unit judges that there are no other use reservations for the band of the priority route.

The storage unit may further include an upper limit value storage unit that stores an upper limit value of the number of priority routes to which the priority information can be set, and that the priority information management unit sets the priority information so as to set the number of the priority routes to equal to or smaller than the upper limit value.

The storage unit of another embodiment includes a priority information storage unit for storing priority information setting a route to be used preferentially at the time of setting the private line connection; a reservation information storage unit for storing private line connection reservation information designating subscriber terminals to which the private line connection is to be set, a period of the private line connection to be set between the subscriber terminals, and a using band used at the time of setting the private line connection; a route information storage unit for storing route information on a route usable in the period of the private line connection; and a band information storage unit for storing using band information on a route usable in the period of the private line connection; and the control unit of the exchange includes a public line connection setting command reception unit for receiving a public line connection setting command to set the public line connection; a reservation command reception unit for receiving a reservation command having the private line connection reservation information; a reservation information management unit for storing the private line connection reservation information received by the reservation command reception unit into the reservation information storage unit of the storage unit; a route deciding unit for deciding a route between the designated subscriber terminals usable in the period, based on the private line connection reservation information in the reservation information storage unit; a priority information management unit for setting the priority information to the route decided by the route deciding unit and storing route information on the route and the priority information into the priority information storage unit of the storage unit; a route information management unit for storing route information on a priority route to which the priority information is set by the priority information management unit into the route information storage unit of the storage unit, together with the period; a band information management unit for storing using band information on the priority route into the band information storage unit of the storage unit, together with the period; a time information confirming unit for confirming the period by referring to the route information storage unit at constant time intervals; and a private line connection control unit for setting automatically a private line connection using the priority route and the using band between the designated subscriber terminals via the exchange switching unit when the time information confirming unit confirms the start time of the period; the private line connection control unit setting the public line connection between certain subscriber terminals without using the priority route, based on the priority route information in the priority information storing unit, when the public line connection setting command reception unit receives the public line connection setting command.

BRIEF DESCRIPTION OF THE DRAWINGS

FIG. 2 is a diagram showing an example of the format of a PVC connection request command in the method according to the present invention;

FIG. 3 is a diagram showing an example of subscriber data in the method according to the present invention;

FIG. 5 is a diagram showing an example of time connection management data in the method according to the present invention;

FIG. 6 is a diagram showing an example of band data in the method according to the present invention;

FIG. 7 is a diagram showing an example of device data in the method according to the present invention;

FIG. 10 is a diagram showing a specific example of the format of a PVC connection request command in the method of the present invention;

FIG. 12 is a diagram showing a concrete example of PVC connection reservation data in the method according to the present invention;

FIG. 17 is a diagram showing a concrete example of time connection management data in the process of the present invention;

FIG. 18 is a diagram showing a specific example of band data used in the process according to the present invention;

FIG. 19 is a diagram used for explaining the PVC path control process in an ATM exchange according to the present invention;

FIG. 28 is a diagram showing a specific example of threshold data in the method according to the present invention;

DETAILED DESCRIPTION OF THE PREFERRED EMBODIMENTS

The embodiments of the present invention will be described below with reference to the attached drawings.

Figure 1:
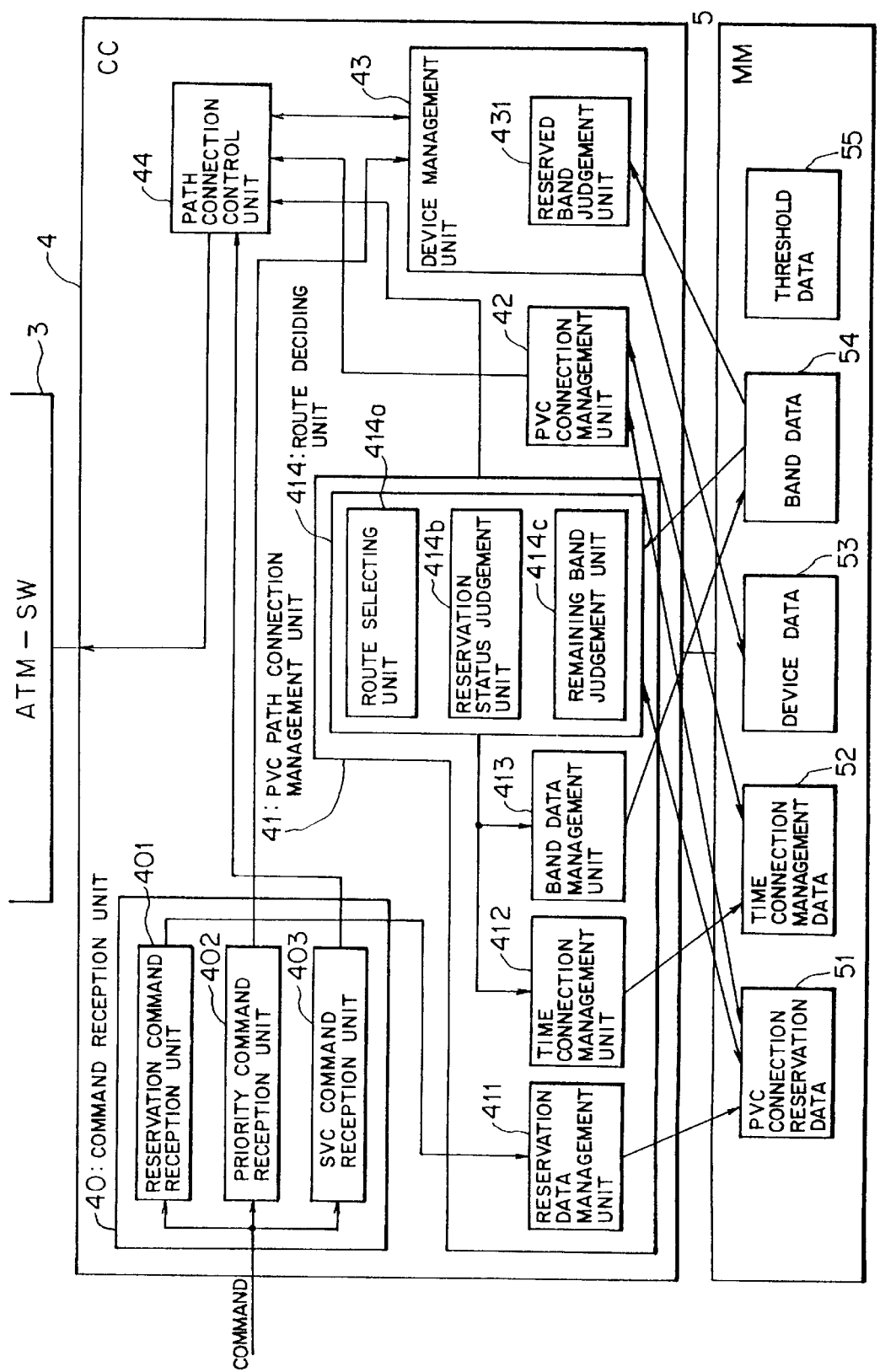
FIG. 1 is a block diagram showing an embodiment of the fixed-length cell handling-type exchange according to the present invention.

FIG. 1 is a block diagram showing an embodiment of the present invention. Referring to FIG. 1, numeral 3 represents an ATM switch (ATM-SW), 4 represents a main control device (CC), and 5 represents a main storage device (MM). These elements are applicable to the ATM exchange 1 before-mentioned with FIG. 29. In the present embodiment, as shown in FIG. 1, the main control device or control unit 4 consists of a command reception unit 40, a PVC path connection management unit 41, a PVC connection management unit 42, a device management unit 43, and a path connection control unit 44. The main storage device or storage unit 5 consists of a PVC connection reservation data storage unit 51, a time connection management data storage unit 52, a device data storage unit 53, a band data storage unit 54, and a threshold data storage unit 55.

Figure 29:
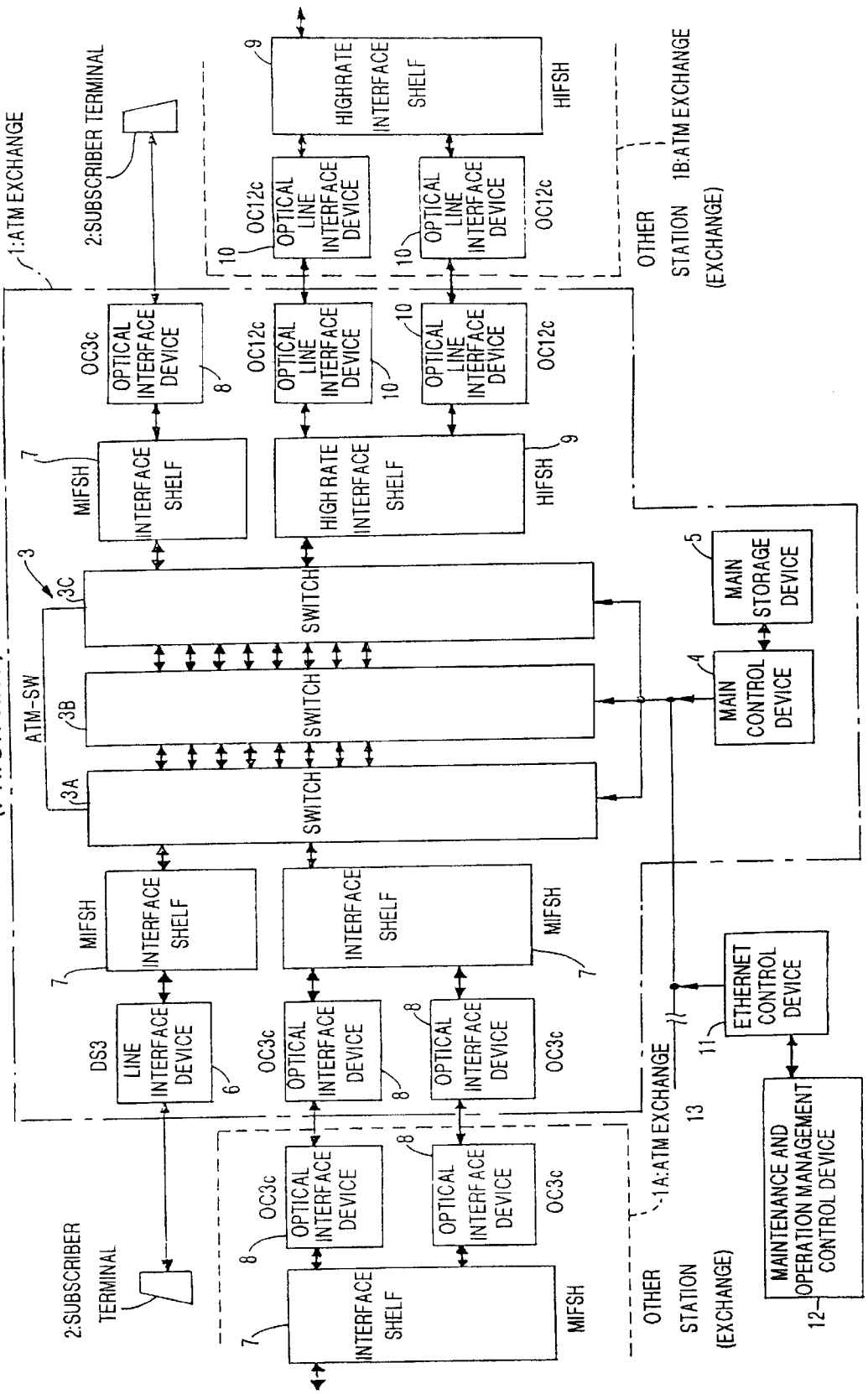
FIG. 29 is a block diagram showing the configuration of a conventional ATM exchange which candles fixed-length cells.

First, in the main storage device 5, the PVC connection reservation data storage unit or reservation information storage unit 51 stores PVC connection reservation data designating subscriber terminals 2 to which a PVC path is to be set (as shown in FIG. 29), a period of the PVC path set between the subscriber terminals 2 (in the present embodiment, designated by a set time or set start time and an open time or set end time, as described later), a using band used at the time of setting the PVC path, and the like. The time connection management data storage unit (route information storage unit and identification information storage unit) 52 stores data on a route usable between the set time/open time of the PVC path.

The "route" described above means a route passing an ATM cell at a PVC setting time. In concrete, the path can be designated, for example, by the path number between subscriber terminals 2 and common devices such as the line interface device (DS3) 6, the middle-rate interface shelves (MIFSH) 7, the optical line interface devices (OC3c) 8, the high-rate interface shelf (HIFSH) 9, and the optical line interface devices (OC12c) 10 before-described with FIG. 29, as well as data (identification information) such as device type and device number of NNI (Network Node Interface).

The device data storage unit (priority information storage unit) 53 stores PVC priority information for previously setting a device [line interface device (DS3) 6, an interface shelf (MIFSH) 7 and the like] and a path preferentially used at the PVC path setting time. The band data storage unit 54 stores using band data regarding a device or path usable during a PVC path period. Using band data of all reservation PVCs is managed on a time basis (e.g. in units of minute). The threshold data storage unit (upper limit value storage unit) 55 stores the threshold (the upper limit value) of the number of devices and number of paths to which PVC priority information is designated as a device or path preferentially used at the time of setting a PVC path.

Data stored in each of the storage units 51 to 55 will be described in detail later by referring to FIGS. 4 to 8.

In the main control device 4, the command reception unit 40 receives various commands transmitted from an operator (maintenance personnel) of the ATM exchange 1 via the maintenance and operation management control device 12 and the Ethernet control device 11 and the Ethernet network 13, for example, before-described with FIG. 29. In the present embodiment, the command reception unit 40, for example, is formed of a reservation command reception unit 401, a priority command reception unit 402 and an SVC (Switched Virtual Channel) command reception unit 403.

The reservation command reception unit 401 receives a PVC connection request command (reservation command) having PVC connection reservation data designating the subscriber terminals 2 to which a PVC is to be set, a set time/open time of the PVC path connected between subscriber terminals 2, and a using band used at the PVC path setting time. In concrete, the command, for example, as shown in FIG. 2, has a format in which various data such as service type (PVC setting/opening), the location of each of subscriber terminals 2 on an originating side/destination side, the telephone number of each of subscriber terminals 2 on an originating side/destination side, VPI/VCI of an originating side/destination side, a using band at the PVC path setting time, and PVC path set time/open time are stored.

When the PVC connection request command designates the telephone number of each of subscriber terminals 2 on an originating side/destination side but does not designate the location of each subscriber terminal 2 on the originating side/destination side, the reservation command reception unit 401 confirms the subscriber data shown in FIG. 3 stored in the subscriber data storage unit (not shown) in the main storage device 5 and then converts the input telephone number into a device location.

The priority command reception unit 402 receives a PVC priority command having PVC priority designation data designating a device or path preferentially used at the PVC path setting time. The SVC command reception unit (public line connection setting command reception unit) 403 receives an SVC command to set an SVC path.

Further, in the main control device 4, the PVC path connection management unit 41 decides a device or path used at a PVC connection time, based on the PVC connection reservation data received by the command reception unit 40, or stores data (such as device data and band data) regarding the device or path decided in the storage units 51 to 54 corresponding to the main storage device 5. As shown in FIG. 1, the PVC path connection management unit 41 is formed of a reservation data management unit 411, a time connection management unit 412, a band data management unit 413 and a route deciding unit 414.

Figure 4:
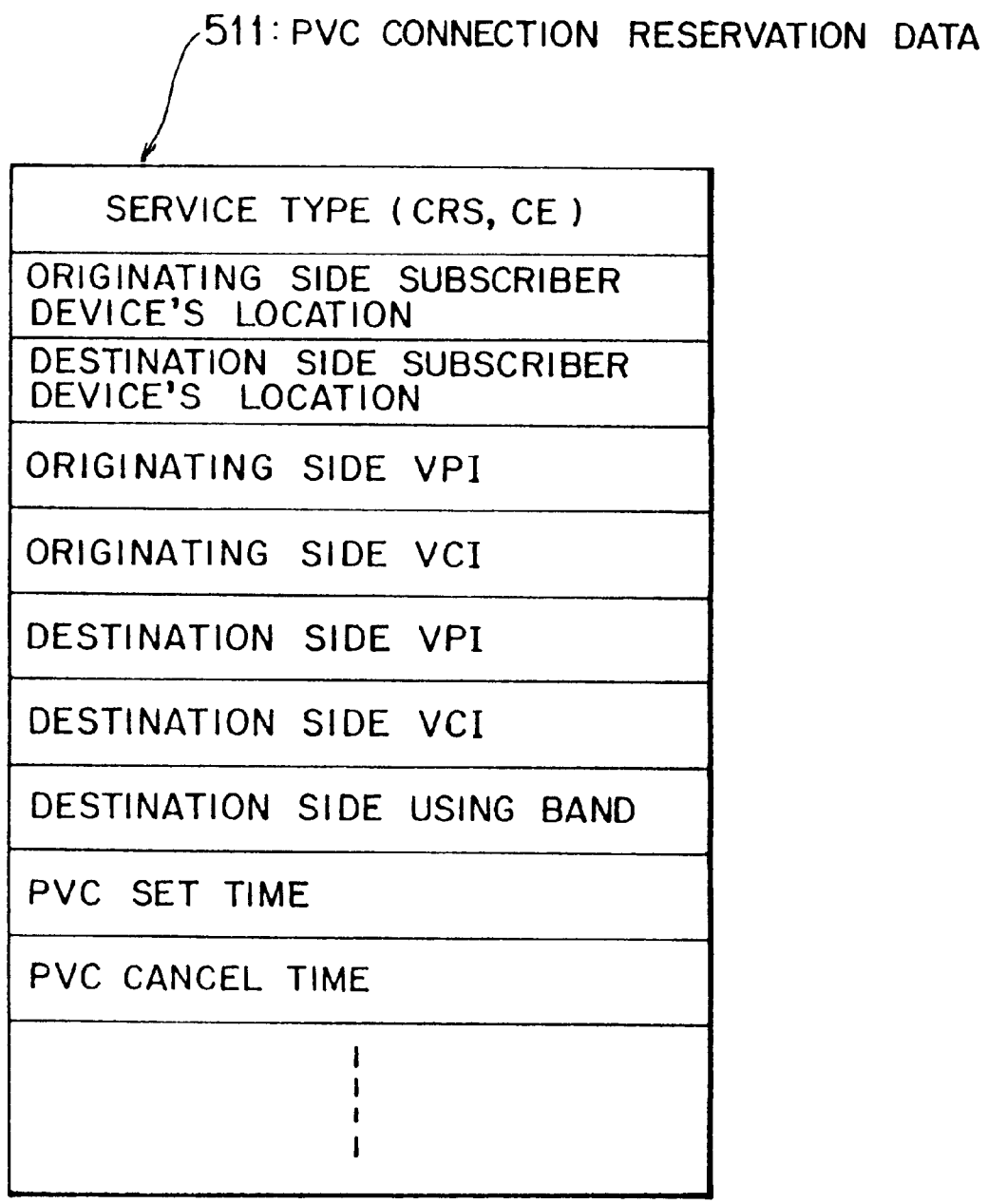
FIG. 4 is a diagram showing an example of the format of PVC connection reservation data in the method according to the present invention.

The reservation data management unit 411 stores data included in the PVC connection request command received by the reservation command reception unit 401 as the PVC connection reservation data 511 having the format, for example, shown in FIG. 4 in the PVC connection reservation data storage unit 51 within the main storage device 5. When the path connection control unit 44 opens the PVC path, the reservation data management unit 411, as described later, deletes the corresponding PVC connection reservation data 511 in the PVC connection reservation data storage unit 51 within the main storage device 5.

The time connection management unit (route/interface unit and path management unit) 52 stores data regarding a device or path decided by the route deciding unit 414 to be used at the PVC path setting time, as the time connection management data 521 having the format, for example, shown in FIG. 5, into the time connection management data storage unit 52 in the main storage device 5, together with the PVC path set time/open time.

In FIG. 5, the types of devices a, b, . . . represent the device type (such as interface shelf and interface device) of devices a, b, . . . , respectively. Numerals of devices a, b, . . . represent the device number inherent to the devices a, b, . . . , respectively. Numerals of routes a, b, . . . represent the route numbers between devices a and b, devices b and c, . . . , respectively.

Likewise, the band data management unit 413 stores data regarding the using band of a device or path decided by the route deciding unit 414, as the band data 541 having a format shown in FIG. 6, into the band data storage unit 54 in the main storage device 5, together with the set time/open time of the PVC path. The route deciding unit 414 decides a device or path between subscriber terminals to which a PVC path setting is designated under a PVC connection request command (hereinafter, merely referred to "designated subscriber terminal") 2 which are usable between the set time and the open time of a PVC route, based on the PVC connection reservation data in the PVC connection reservation data storage unit 51.

For that reason, the route deciding unit 414 consists of a route selecting unit 414a, a reservation status judgment unit 441b, and a remaining band judgment unit 414c. The route selecting unit 414a selects arbitrarily a device or path between designated subscriber terminals 2 used at the PVC setting time, based on the PVC connection reservation data (refer to FIG. 4) in the PVC connection reservation data storage unit 51. The reservation status judgment unit 414b judges whether or not there is already a use reservation for another PVC path setting in a selected route selected by the route selecting unit 414a, based on the time connection management data (as shown in FIG. 5) in the time connection management data storage unit 52.

The remaining band judgment unit 414c judges whether or not the band at a PVC route set time/open time of a device or path selected by the route selecting unit 414a is left equal to or larger than the using band designated under the PVC connection request command, based on the band data (refer to FIG. 6) stored in the band data storage unit 54.

The route deciding unit 414, as described later, decides device or path as a device or path usable at the PVC path setting time when the reservation status judgment unit 414b judges that the selected device or path includes no use reservation for another PVC path, or when there is a reservation but the remaining band judgment unit 414c judges that the band at the PVC path set time/open time of the device or path is left equal to or larger than the using band.

When the remaining band judgment unit 414c judges that the band at the set time/open time of the selected device or path is not left equal to or larger than the using band, the device or path usable at a PVC path setting time is decided by selecting a device or path other than the device or path.

Next, the PVC connection management unit (time information confirming unit) 42 confirms the set time/open time of the PVC path by referring to PVC connection reservation data in the PVC connection reservation data storage unit 51 or time connection management data in the time connection management data storage unit 52 at constant time intervals (e.g. in units of minute). The device management unit (priority information management unit) 43 sets PVC priority designation (priority information) to a device or path preferentially used at a PVC path setting time and stores data (identification information) inherent to the PVC priority device or path into the device data storage unit 53 in the main storage device 5 as the device data 531 for every device type and device number, e.g. as shown in FIG. 7.

Referring to FIG. 7, the PVC priority indicates whether or not the device (or path) is a device which is preferentially used at a PVC setting time. The upper device type/upper device number indicates the type/inherent number of a device connected on the upper side thereof. The lower device type/lower device number indicates the type/inherent number of a device connected on the lower side thereof.

The device management unit 43 includes a reserved band judgment unit 431 that judges whether or not there is a use reservation for another PVC path setting to the band of the PVC priority device (or path) when the PVC path using the PVC priority device is opened. When the reserved band judgment unit 431 judges that there is a use reservation for the band of the PVC priority device, the PVC priority designation set to the PVC priority device is not canceled. When the reservation band judgment unit 431 judges that there is no use reservation, the PVC priority designation set to the PVC priority device is canceled.

Figure 8:
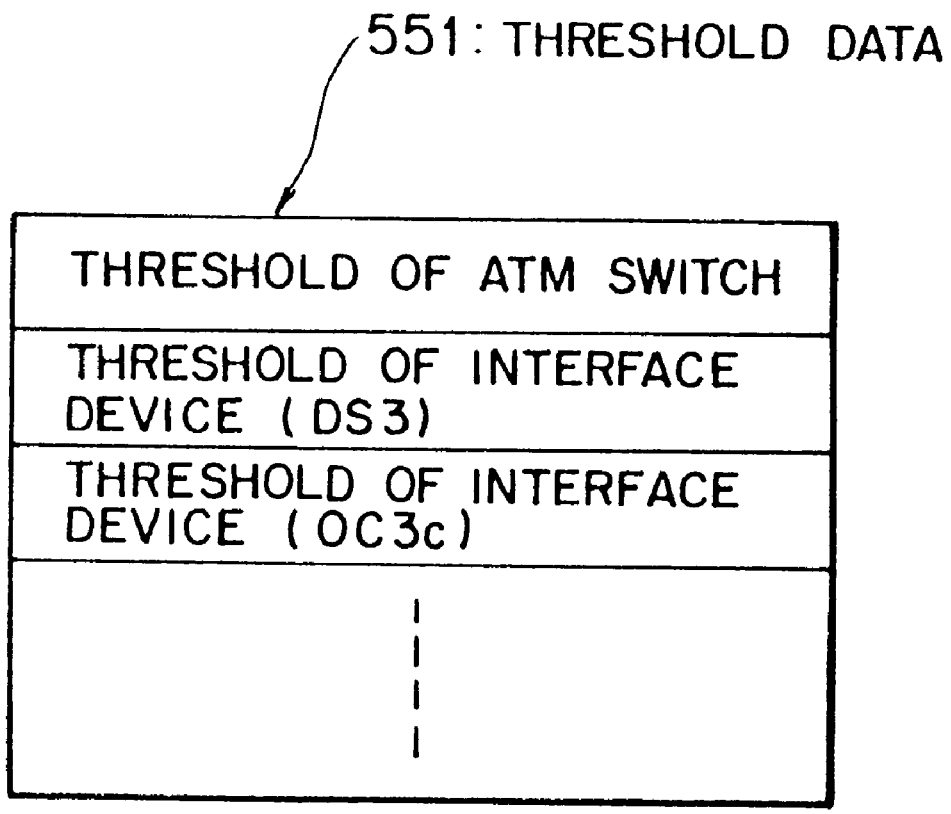
FIG. 8 is a diagram showing an example of threshold data used in the method according to the present invention.

As shown, for example, in FIG. 8, when the PVC priority is set to a device or path between designated subscriber terminals 2, the device management unit 43 sets PVC priority designation so as to bring the number of devices or paths to which PVC priority designation is set to equal to or smaller than a threshold by referring to the threshold data 551 in the threshold data storage unit 55 of which the upper limit is determined for the number of PVC priority designation settings for each of the devices including the ATM switch 3, the line interface device (DS3) 6, the optical line interface device (OC3c) 8 and the like (refer to FIG. 29).

The path connection control unit (private line connection control unit) 44 performs automatically a set/open control of a PVC path between the designated subscriber terminals 2 via the ATM switch 3, according to the PVC path set time/open time confirmed by the PVC connection management unit 42. When the SVC command reception unit 403 receives a command for an SVC path setting, the path connection control unit 44, as described later, sets an SVC path, based on the device data 531 (PVC priority information) of the device data storage unit 53, without using the device or path designated as a PVC priority.

The PVC controlling (setting/opening) method in the ATM exchange 1 with the above-mentioned configuration according to the present embodiment will be in detail described below.

(1) No reservation of devices or paths used between designated subscriber terminals 2.

Figure 9:
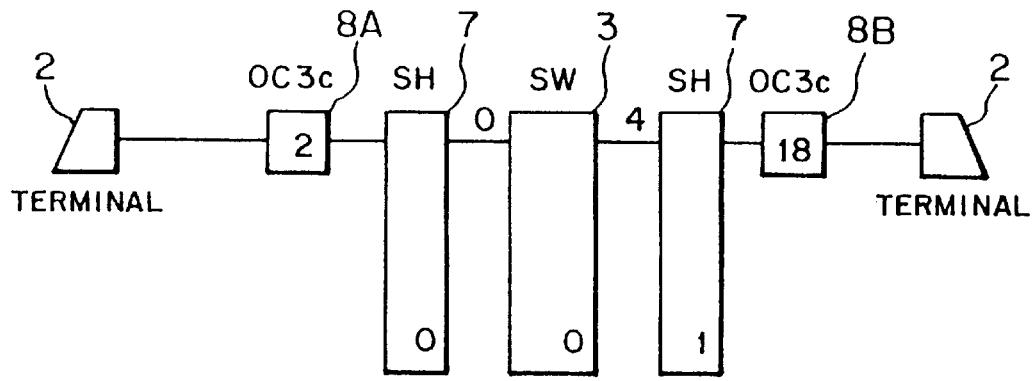
FIG. 9 is a diagram used for explaining a PVC path control process in an ATM exchange according to the present invention.

First, let us consider setting a PVC path between subscriber terminals 2 as shown in FIG. 9. In FIG. 9, elements with the numerals equal to those shown in FIG. 27 correspond to elements described above with FIG. 27. Numerals 8A and 8B are equivalent to the optical line interface devices (OC3c) 8 shown in FIG. 27.

When it is reservation and set, for example, that the service type is a cell relay (Cell Relay="1"), that the device location of the optical line interface device (originating side subscriber device) 8A is "3020320200", that the telephone number is "0", that the device location of the optical line interface device (destination side subscriber device) 8B is "3020330400", that the telephone number is "0", that the originating side VPI and VCI are "0" and "127", respectively, that the destination side VPI and VCI are "0" and "129", respectively, that the using band is 140 Mbps, and that the PVC path starts at 9:55 ("0955") and opens at 14:00 ("1400"), an operator of the ATM exchange 1 enters a PVC connection request command designating data shown in FIG. 10 to the ATM exchange 1 via the Ethernet network 13 using the maintenance and operation management control device 12.

Figure 11:
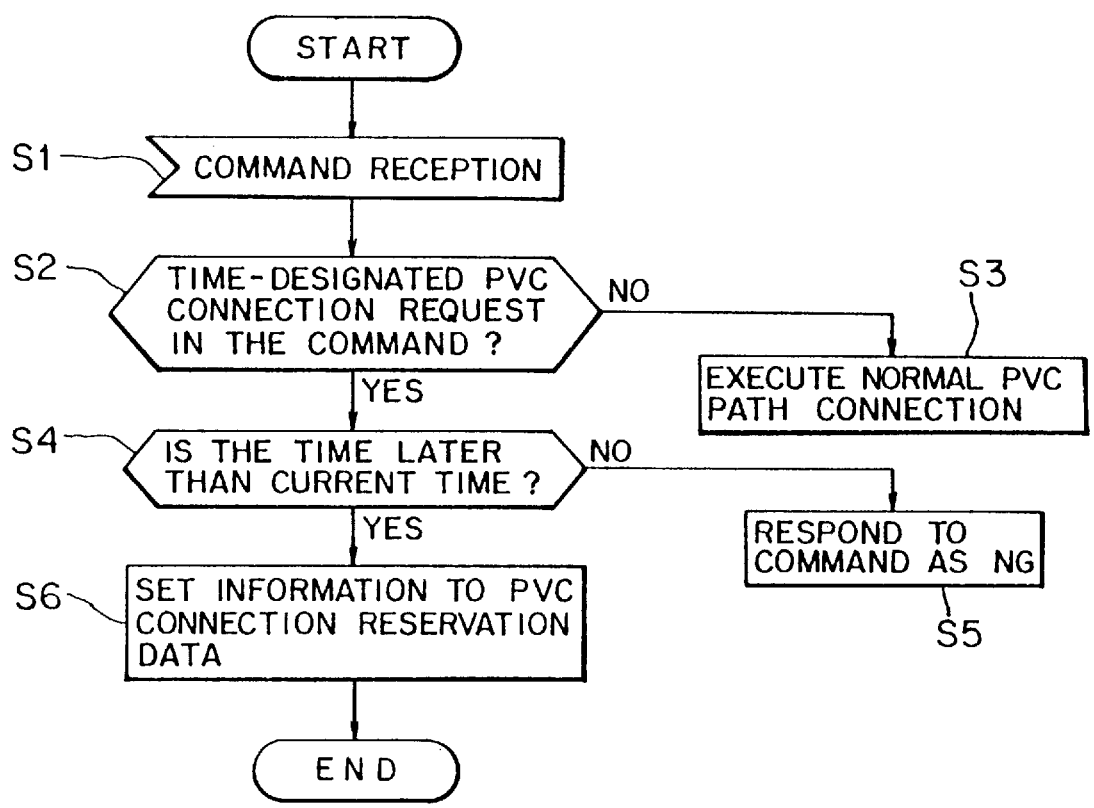
FIG. 11 is a flowchart used for explaining a PVC path control process in an ATM exchange according to the present invention.

As shown in FIG. 11, when the command reception unit 40 (reservation command reception unit 401) in the main control device 4 receives the PVC connection request command (step S1), the reservation data management unit 411 in the PVC path connection management unit 41 arranged in the main control device 4 analyzes data included in the received command and then judges whether or not there is time designation (set time/open time) of the PVC path (step S2).

As a result, when there is no time designation, the path connection control unit 44 sets as usual the PVC path at the command receiving time (From step S2 to step S3 via NO route). If there is time designation, it is further judged whether or not the designated time (9:55) is later than the current time (step S2 to step S4 via YES route ). If the set time is earlier than the current time, the command data in abnormal state (NG) is reported to the operator (step S4 to step S5 via NO route).

On the other hand, if the set time is later than the current time, data included in the received PVC connection request command is stored as PVC connection reservation data 511 shown in FIG. 11 into the PVC connection reservation data storage unit 51 in the main storage device 5 (step S4 to step S6 via YES route).

Figure 13:
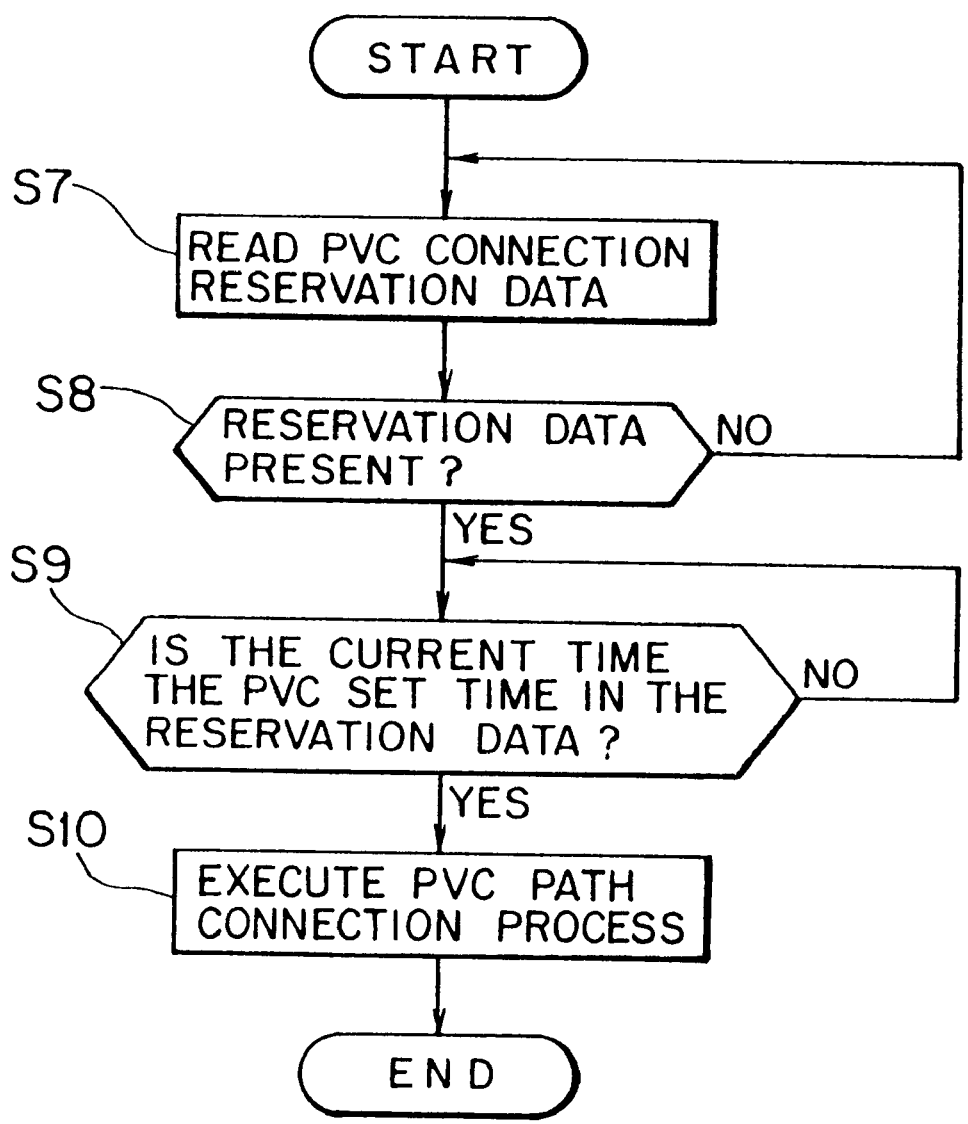
FIG. 13 is a flowchart used for explaining the PVC path control process of an ATM exchange according to the present invention.

Thereafter, in the main control device 4, as shown in FIG. 13, the PVC connection management unit 42 reads (refers to) data in the PVC connection reservation data storage unit 51 within the main storage device 5 at constant time intervals (in units of minute) (step S7), and then judges whether or not there is PVC connection reservation data 511 (step S8). If there is no PVC connection reservation data 511, another data is referred to (NO route in step S8). If there is PVC connection reservation data 511, it is judged whether or not the current time is the PVC path set time (9:55) (step S8 to step S9 via YES route).

If the current time is not the set time, the PVC connection management unit 42 continues to refer to the PVC connection reservation data 511 till the set time comes (NO route in step S9). When it is detected that the current time becomes the set time, the PVC path connection management unit 41 is activated. The PVC path connection management unit 41 searches for a path connectable band, based on the band data 541 stored in the band data storage unit 54 in the main storage device 5, and activates the path connection control unit 44. Then the path connection control unit 44 sets automatically the PVC path (step S9 to step S10 via YES route).

Figure 14:
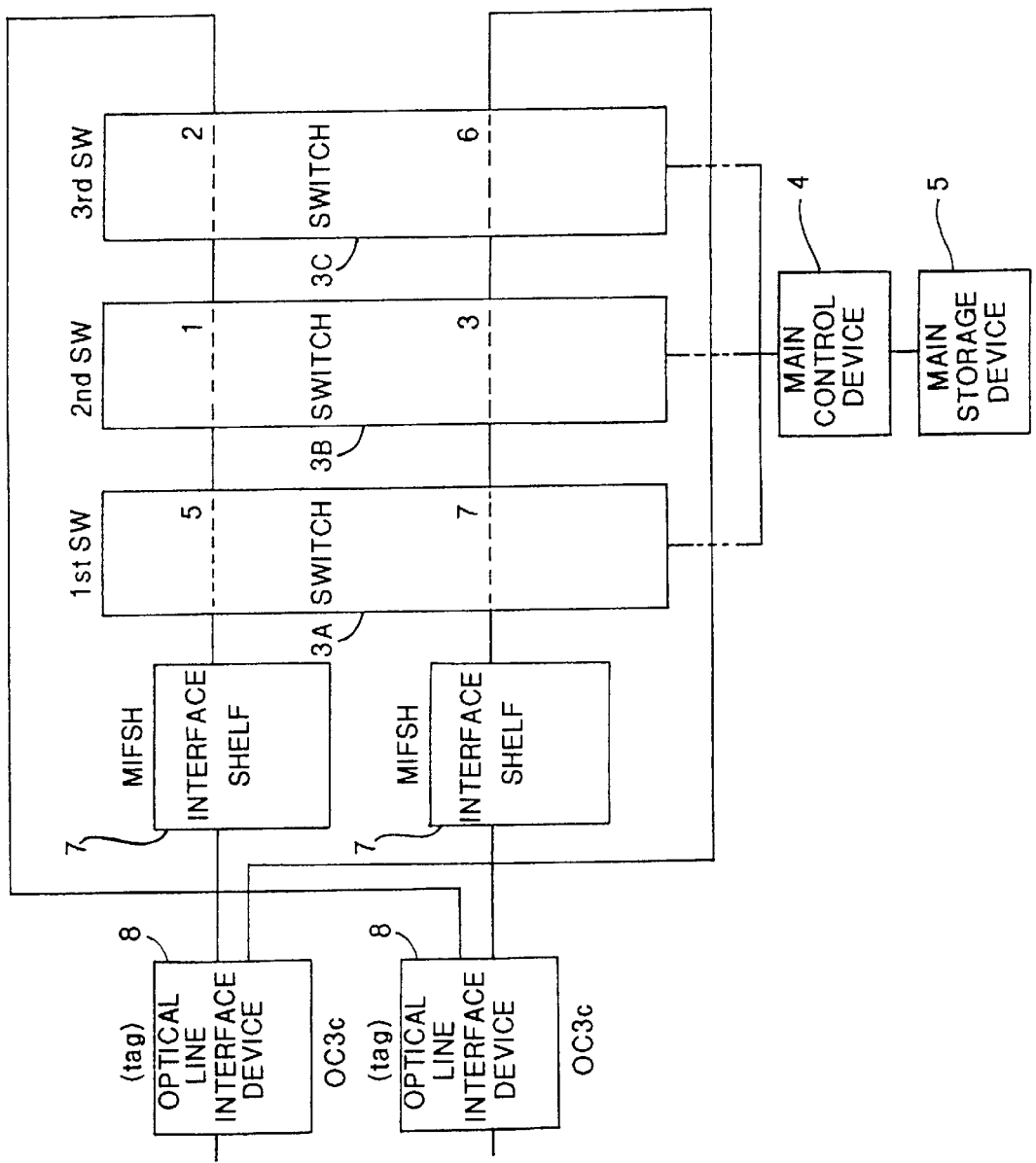
FIG. 14 is a diagram used for explaining the PVC path control process of an ATM exchange according to the present invention.
Figure 30:
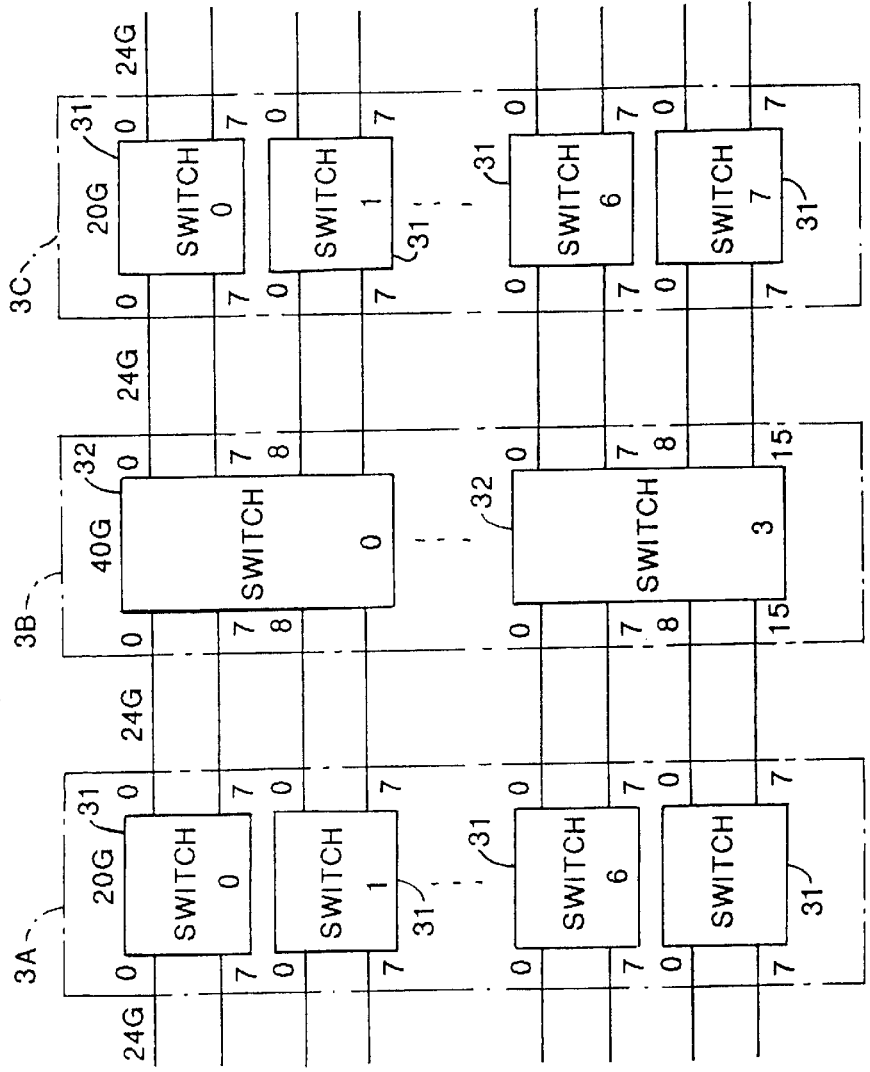
FIG. 30 is a block diagram showing the configuration of a conventional ATM switch.
Figure 31:
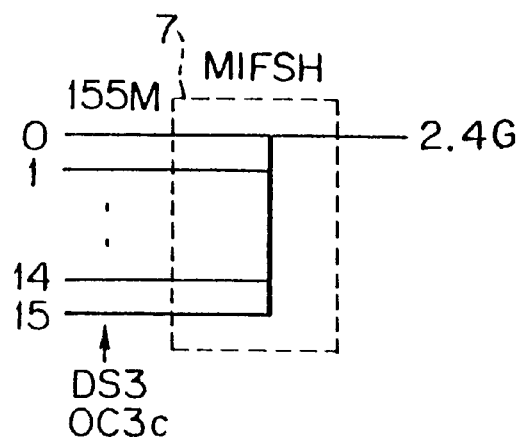
FIG. 31 is a conceptual diagram used for explaining the rate conversion in a conventional middle-speed interface shelf.
Figure 32:
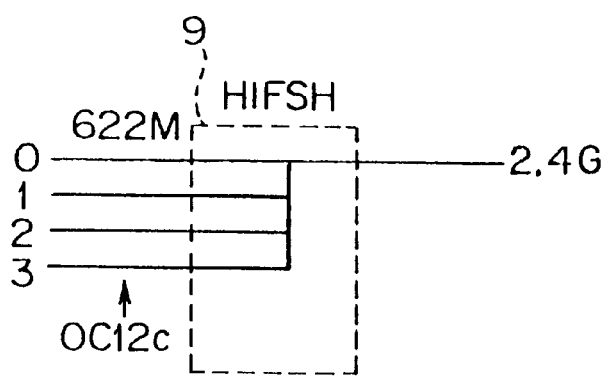
FIG. 32 is a conceptual diagram used for explaining the rate conversion in a conventional high-speed interface shelf.
Figure 33:
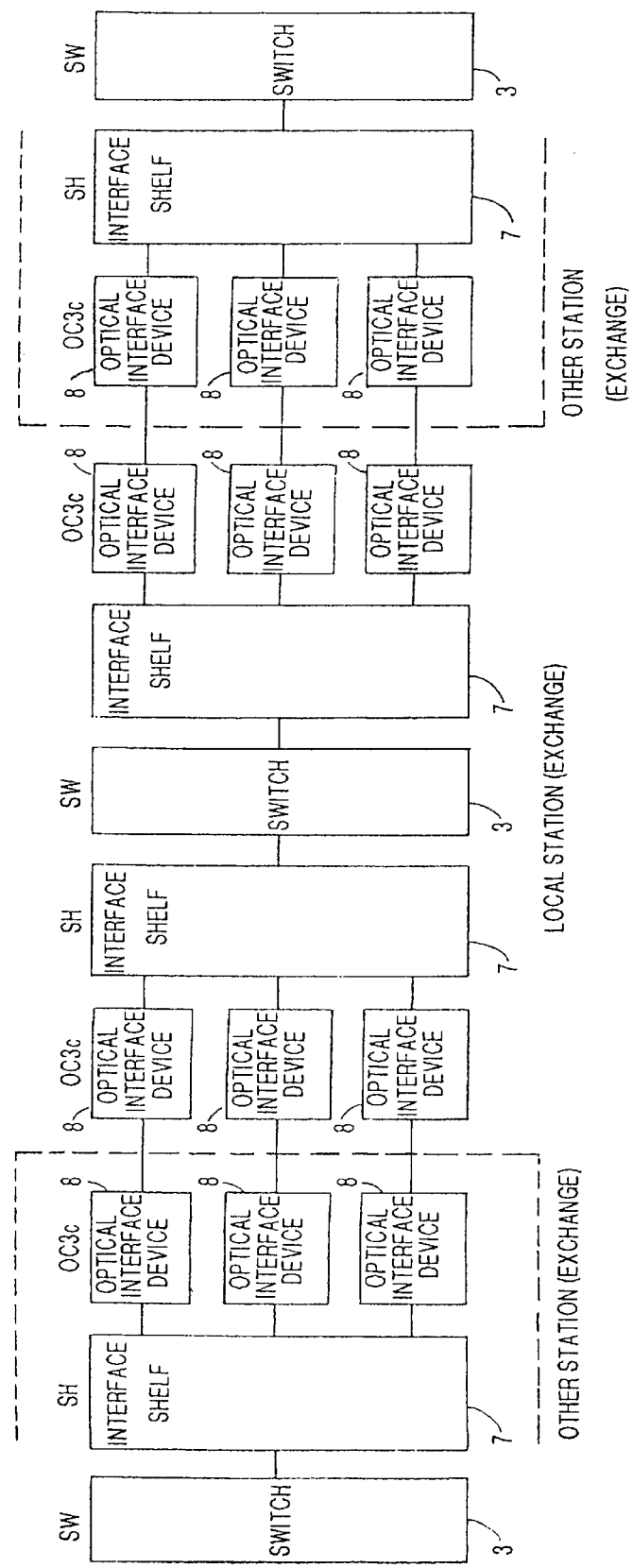
FIG. 33 is a block diagram showing an example of an intra-station connection between conventional ATM exchanges.
Figure 34:
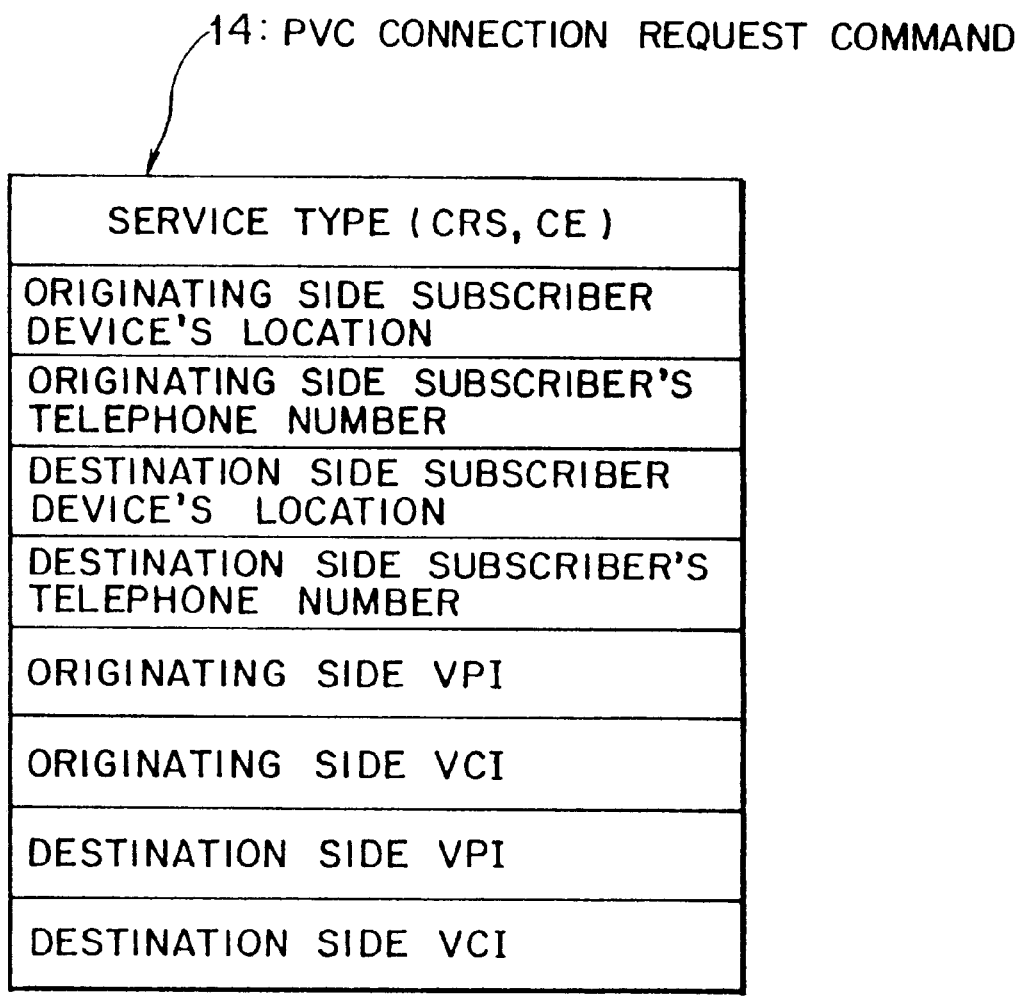
FIG. 34 is a diagram showing an example of the format of a conventional PVC connection request command.

In concrete, the path connection control unit 44 searches for the path for the ATM switch 3 (switch stages 3A to 3C: refer to FIGS. 29 and 30) usable ranging from VPI and VCI of an originating side subscriber device (optical line interface device 8) to VPI and VCI of the designation side subscriber device, as shown in FIG. 14, and then informs the interface shelf 7 of the path information (routing information: "512" or "736" in FIG. 14) via the ATM switch 3 as soon as the path is decided. Thus a PVC path is set between the designated subscriber terminals 2 by rewriting the tag information of an ATM cell passing through the ATM switch 3 and then fixing the cell transfer route.

Figure 15:
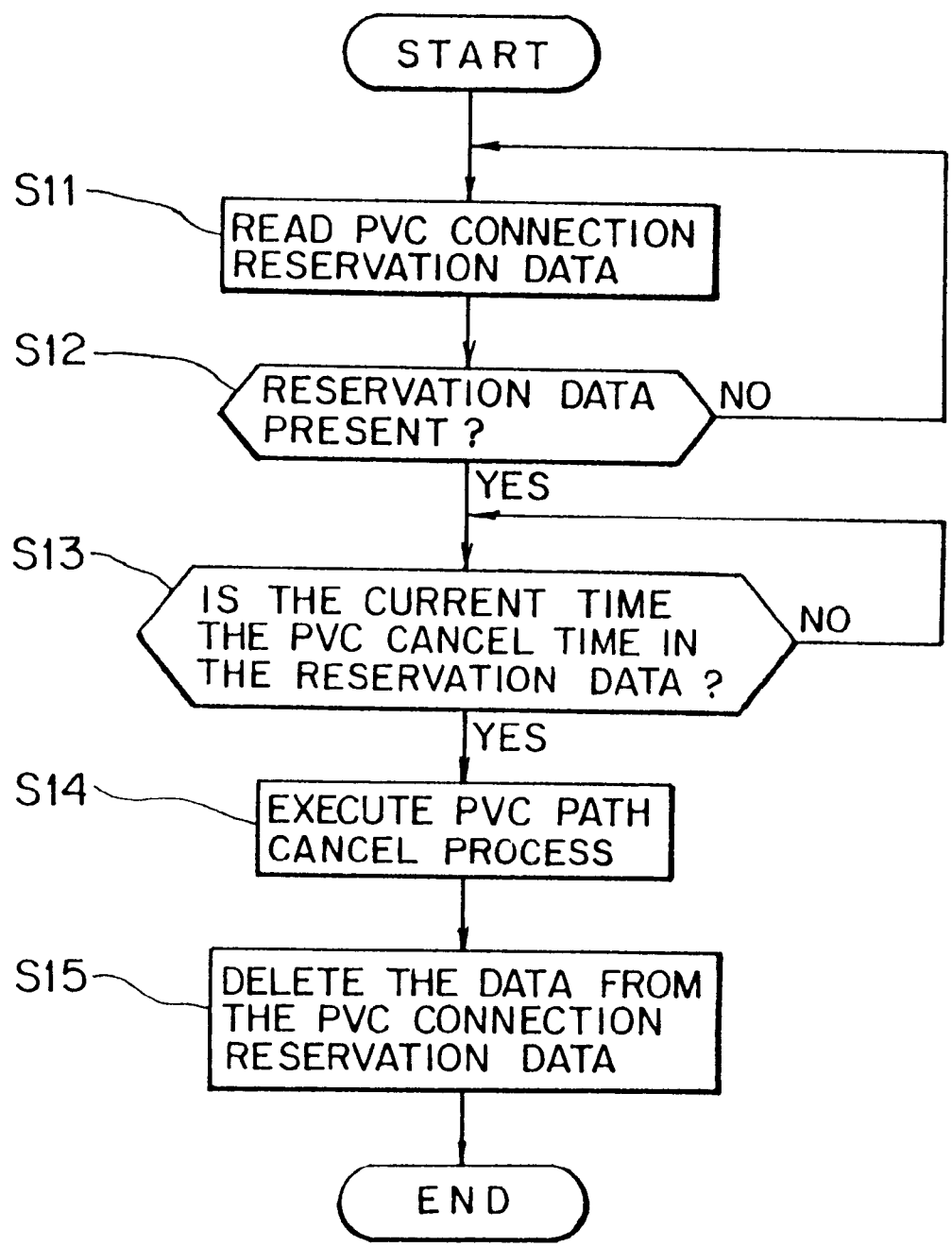
FIG. 15 is a flowchart used for explaining the PVC path control process of an ATM exchange according to the present invention.

Thereafter, in the main control device 4, as shown in FIG. 15, the PVC connection management unit 42 reads (refers to) data included in the PVC connection reservation data storage unit 51 in the main storage device 5 at constant time intervals (in units of minute) (step S11), and then judges whether or not there is PVC connection reservation data 511 (step S12). If there is no PVC connection reservation data 511, another data is referred to (NO route in step S12). If there is PVC connection reservation data 511, it is judged whether or not the current time is the PVC path open time (14:00) (from step S12 to step S13 via YES route).

If the current time is not the open time, PVC connection management unit 42 continues to refer to the PVC connection reservation data 511 till the open time comes (NO route in step S13). If it is detected that the current time becomes the open time, the PVC path connection management unit 41 is activated.

The PVC path connection management unit 41 searches for a PVC path to be opened based on the PVC connection reservation data in the PVC connection reservation data storage unit 51 and then activates the path connection control unit 44. The path connection control unit 44 opens automatically the PVC path above set (from step S13 to step S14 via YES route). Then the reservation data management unit 411 in the PVC path connection management unit 41 deletes the corresponding PVC connection reservation data 511 in the PVC connection reservation data storage unit 51 within the main storage device 5 (step S15).

As described above, according to the ATM exchange 1 of the present embodiment, the PVC path can be automatically set during the period under the PVC connection request command in which the PVC period (start time/open time) is designated, based on the PVC connection reservation data 511 included in the command thereof. Hence, the procedure of setting or canceling the PVC path is not needed to the exchange 1 at the time of actually setting or opening the PVC path. This feature liberates an operator in charge of maintenance and operation of the exchange 1 from setting and opening PVC paths on a 24-hour basis, whereby the burden can be remarkably reduced.

In the above-mentioned embodiment, the period is designated with the set start time (9:55) and open time (14:00) of a PVC path. The period may be designated with the set start time (9:55) and the time (four hours and five minutes) lapsed from the set start time. In either case, the time band for setting a PVC path can be reserved and designated very easily.

(2) The case where a device or path used between designated subscriber terminals 2 is reserved:

Referring to FIG. 9, the case where a route (device or path) to be used is reserved when a PVC path is set between designated subscriber terminals 2 will be described below in detail. In FIG. 9, it is assumed that the device type of the ATM switch 3 between designated subscriber terminals 2 is "32"; the device number is "0"; the device type of each interface shelf (MIFSH) 7 is "35"; the device numbers are "0" and "1", respectively; the device type of each of the line interface devices (OC3c) 8A and 8B is "66"; the device numbers are "2" and "18", respectively; and the path numbers between the ATM switch 3 and the interface shelves 7 are "0" and "4", respectively.

In this case, using the maintenance and operation management control device 12, an operator of the ATM exchange 1 first enters a PVC connection request command designating the data shown in FIG. 10 to the ATM exchange 1 via the Ethernet network 13.

Figure 16:
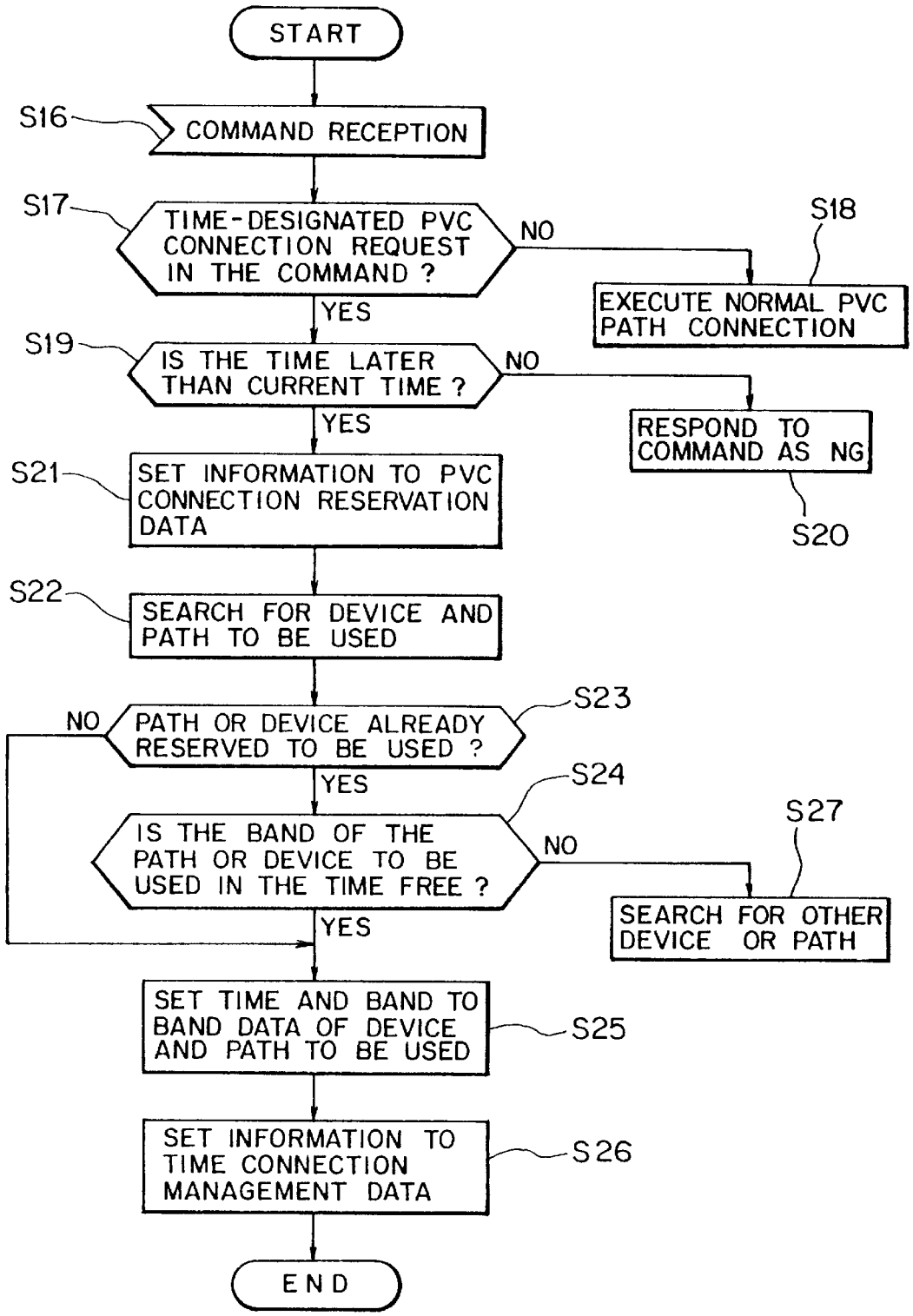
FIG. 16 is a flowchart used for explaining the PVC path control process of an ATM exchange according to the present invention.

As shown in FIG. 16, when the command reception unit 40 (reservation command reception unit 401) in the main control device 4 receives the PVC connection request command (step S16), the reservation data management unit 411 in the PVC path connection management unit 41 within the main control device 4 analyzes data within the received command and then judges whether or not there is PVC path time designation (set time/open time) (step S17).

As a result, when there is no time designation, the path connection control unit 44 executes as usual the PVC path setting at the command receiving time (from step S17 to step S18 via NO route). When there is time designation, it is further judged whether or not the set time (9:55) designated is later than the current time (from step S17 to step S19 via YES route). If the set time is earlier than the current time, the command data in an abnormal state (NG) is reported to an operator (from step S19 to step S20 via NO route). If the set time is later than the current time, the PVC connection reservation data storage unit 51 in the main storage device 5 stores data included in the received PVC connection request command as the PVC connection reservation data 511 shown in FIG. 11 (step S19 to step S20 via YES route).

The route deciding unit 414 in the PVC path connection management unit 41 searches for and decides a device or path between designated subscriber terminals 2 usable at the PVC set time (9:55)/open time (14:00), based on the PVC connection reservation data 511 in the PVC connection reservation data storage unit 51, by means of the route selecting unit 414a, the reservation status judgment unit 414b and the remaining band judgment unit 414c (step S22).

In concrete, in the route deciding unit 414, the route selecting unit 414a selects arbitrarily a device or path between the designated subscriber terminals 2, based on the PVC connection reservation data 511 in the PVC connection reservation data storage unit 51. The reservation status judgment unit 414b judges whether or not there is already a use reservation for setting another PVC path in the device or path selected by the route selecting unit 414a, based on the time connection management data 521 already registered in the time connection management data storage unit 52 (step S23).

As a result, when it is judged that there is no use reservation for another PVC path in the selected device or path, the device or path is decided as a device or path usable at the time of setting the PVC path. The band data storage unit 54 stores the band data (using band: 140 Mbps) on the device or path as the band data 541 shown in FIG. 18, together with the PVC set time/open time (step S25). The time connection management data storage unit 52 stores the device type, device number and route number of an interface device as the time connection management data 521 shown in FIG. 17, together with the PVC set time/open time (step S26).

In this case, among plural pieces of data shown in FIG. 9, the data including the PVC path set time ("0955")/open time ("1400"), the device type ("66")/device number ("2") of the originating side line interface device (OC3c) 8A, the device type ("66")/device number ("18") of the destination side line interface device (OC3c) 8B, the device type ("32")/device number ("0") of the ATM switch 3, and the path number ("0", "4") are stored in the time connection management data 521. The data including the PVC set time ("0955")/open time ("1400"), originating side VPI, VCI ("0", "127"), and the designation side VPI, VCI ("0", "129") are stored in the band data 541.

In the step S23, when the device or path selected by the route selecting unit 414a already includes a use reservation for another PVC path, the remaining band judgment unit 414c in the route deciding unit 414 judges whether or not the band for the device or path selected by the route selecting unit 414a is free at the PVC path set time/open time, based on another band data 541 of the band data storage unit 54 (from step S23 to step S24 via YES route).

For example, as shown in FIG. 19, when the band for the line interface device (OC3c) 8A or 8B is free by a using band (140 Mbps) between 9:55 and 14:00, the line interface device (OC3c) 8A or 8B is decided as a route usable at the PVC path setting time. The band data (using band) 541 and the time connection management data 521 of the line interface device (OC3c) 8A or 8B are respectively stored into the band data storage unit 54 and the time connection management data storage unit 52 (step S24 to steps S25 and S26 via YES route).

In the step S24, when it is judged that the band for the selected interface device or path is not free at the PVC set time/open time (or is not left equal to or larger than the using band), the remaining band judgment unit 414c decides a device or path usable at the PVC path setting time by selecting a new one other than the device or path (from step S24 to step S27 via NO route).

Figure 20:
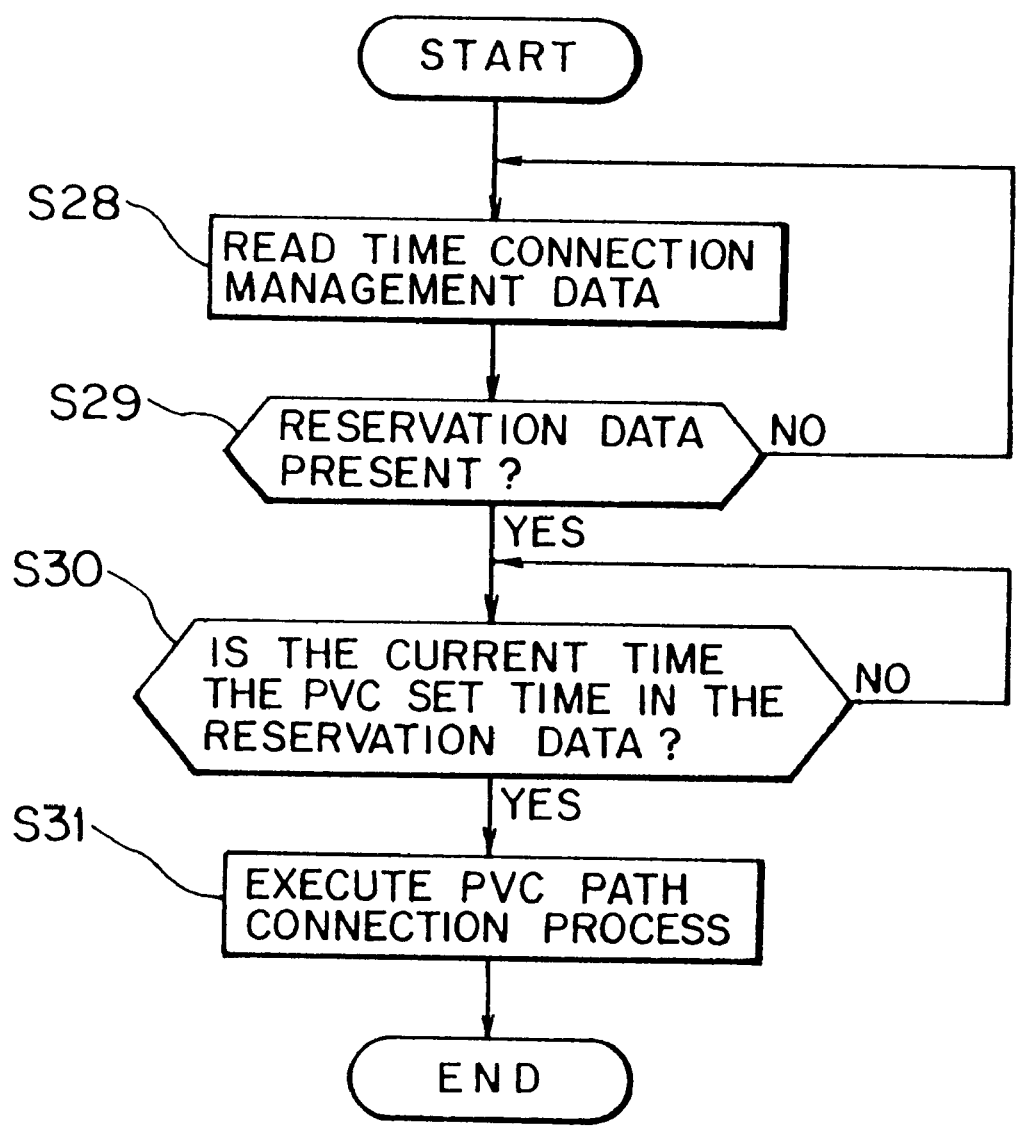
FIG. 20 is a flowchart used for explaining the PVC path control process in an ATM exchange according to the present invention.

Thereafter, as shown in FIG. 20, the PVC connection management unit 42 reads (refers to) data in the time connection management data storage unit 52 within the main storage device 5 at constant time intervals (in units of minute) (step S28), the PVC connection management unit 42 judges whether or not there is the time connection management data 521 (step S29). If no, the PVC connection management unit 42 refers to another data (NO route in step S29). If yes, the PVC connection management unit 42 judges whether or not the current time is the PVC path set time (step S29 to step S30 via YES route).

If the current time is not the set time, the PVC connection management unit 42 continues to refer to the PVC connection reservation data 511 till the set time (NO route in step S30). If it is detected that it becomes the start time, the PVC path connection management unit 41 is activated. When receiving a connection request, the PVC path connection management unit 41 refers to the time connection management data 521 in the time connection management data storage unit 52 and verifies the path or device set therein and then activates the path connection control unit 44. The path connection control unit 44 sets a PVC path by using the device or path set in the time connection management data 521 (from step S30 to step S31 via YES route).

Figure 21:
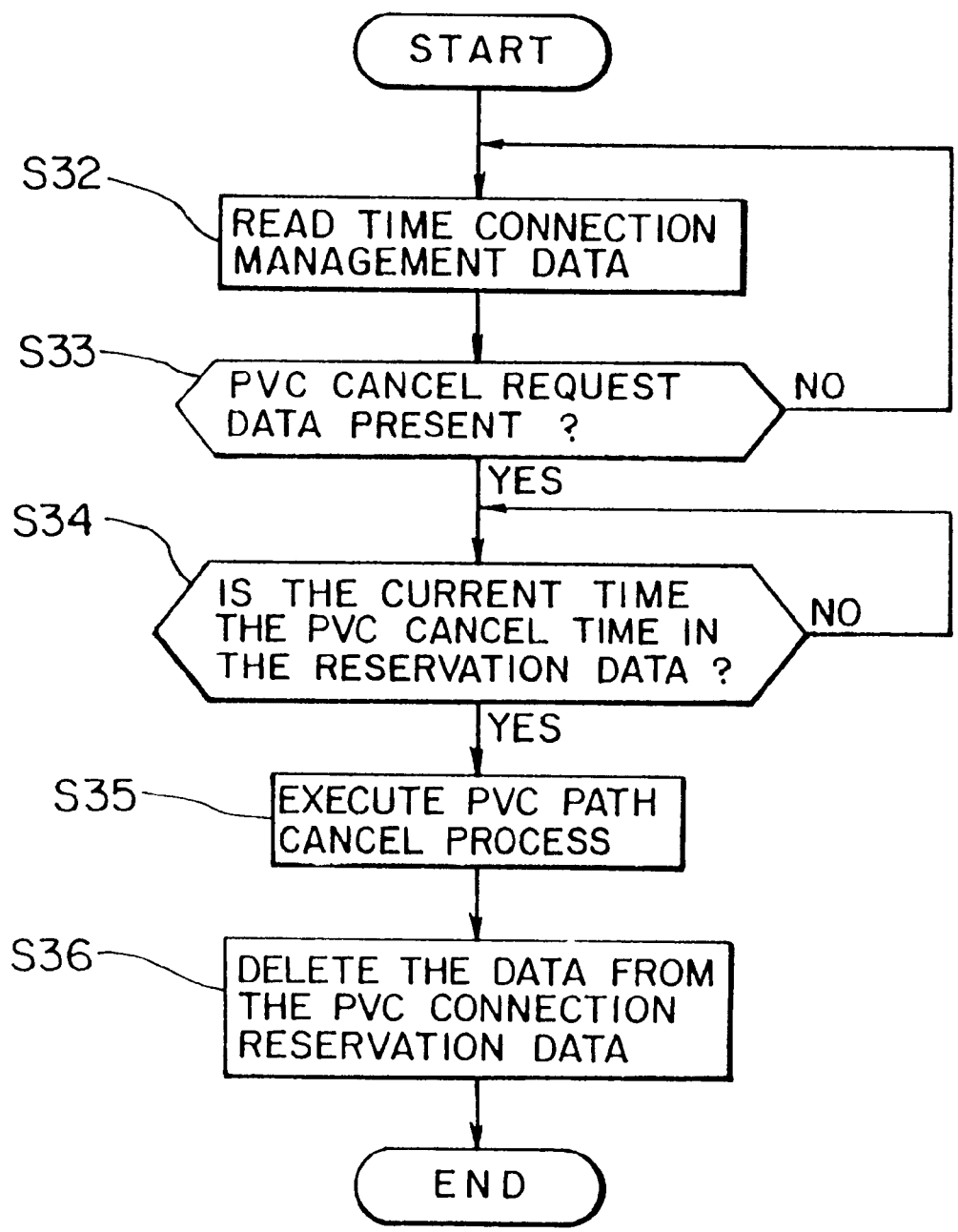
FIG. 21 is a flowchart used for explaining the PVC path control process in an ATM exchange according to the present invention.

Consequently, as shown in FIG. 21, the PVC connection management unit 42 in the main control device 4 reads (refers to) data in the PVC path reservation data storage unit 51 within the main storage device 5 at constant time intervals (step S32), and judges whether or not there is open request data (or the open time is set) (step S33). If no, the PVC connection management unit 42 refers to another data (NO route in step S33). If yes, the PVC connection management unit 42 judges whether or not the current time is the PVC path open time (from step S33 to step S34 via YES route).

If the current time is not the open time, the PVC connection management unit 42 continues to refer to the time connection management data 521 until the open time (NO route in step S34). When it is detected that it becomes the open time, the PVC path connection management unit 41 is activated.

The PVC path connection management unit 41 searches for a PVC path to be opened based on the time connection management data 521 in the time connection management data storage unit 52, and activates the path connection control unit 44. Then, the PVC path set above is automatically opened by the path connection control unit 44 (from step S34 to step S35 via YES route). At this time, the reservation data management unit 411 in the PVC path connection management unit 41 deletes the corresponding PVC connection reservation data 511 in the PVC connection reservation data storage unit 51 within the main storage device 5 (step S36).

In such a manner, according to the ATM exchange 1, an interface device or path usable at the set time/open time is previously decided and reservation based on PVC connection reservation data 511 designating respectively the subscriber terminal 2 to which a PVC path is to be set, a set time/open time of the PVC path (period), and a using band.

When the PVC path set time comes, a PVC path using an interface device, path and using band reserved is automatically set. Hence, it does not occur that the PVC path cannot be set because an interface device or path to be used at the time of the PVC path setting operation cannot be used due to a shortage in band. The PVC path can be set always and certainly at a desired time slot.

At this time, the PVC path connection management unit 41 (route deciding unit 414) decides a device or path used at a PVC path setting time by first arbitrarily selecting a device or path between the designated subscriber terminals 2, judging whether or not there is a use reservation for another PVC path to the device or path, and judging whether or not the band at the set time/open time of the device or path is left equal to or larger than a necessary band (using band: 140 Mbps). Hence, an operator who sets a PVC path to the exchange 1 can reserve and set a PVC path without being conscious of information regarding how many what band is left in what device or path. Thus, the burden of an operator can be further reduced at a PVC path reserving and setting time.

Further, when the band at the set time/open time of the device or path is not left equal to or larger than a necessary band, a usable device or path can be automatically decided by selecting another device or path and performing the judging process as described above. As a result, there is scarcely the case where the PVC path cannot be set because of no usable device or path.

Since the PVC path set is automatically canceled by means of the path connection control unit 44 at the open time, it is unnecessary to perform the procedure of canceling the PVC path (such as a command entry operation by an operator). Further, the burden to an operator which performs the PVC path open control can be reduced while the unnecessary PVC connection reservation data 511 within the PVC connection reservation data storage unit 51 can be deleted from the main storage device 5 after opening the PVC path. Therefore, the PVC path setting/opening can be accurately continued while the capacity of the main storage device 5 can be suppressed to a minimum.

(3) The case where a PVC priority device is set:

Next, the process in the case where a device or path preferentially used at a PVC path setting time (PVC priority device, path) is previously set and the PVC priority device or path is used automatically at a PVC path setting time is described below in detail.

First, an operator of the ATM exchange 1 enters a PVC priority command designating data regarding the PVC priority device (or path) (PVC priority information for setting PVC priority) shown in FIG. 7 by the maintenance and operation management control device 12 to the ATM exchange 1 via the Ethernet network 13.

Figure 22:
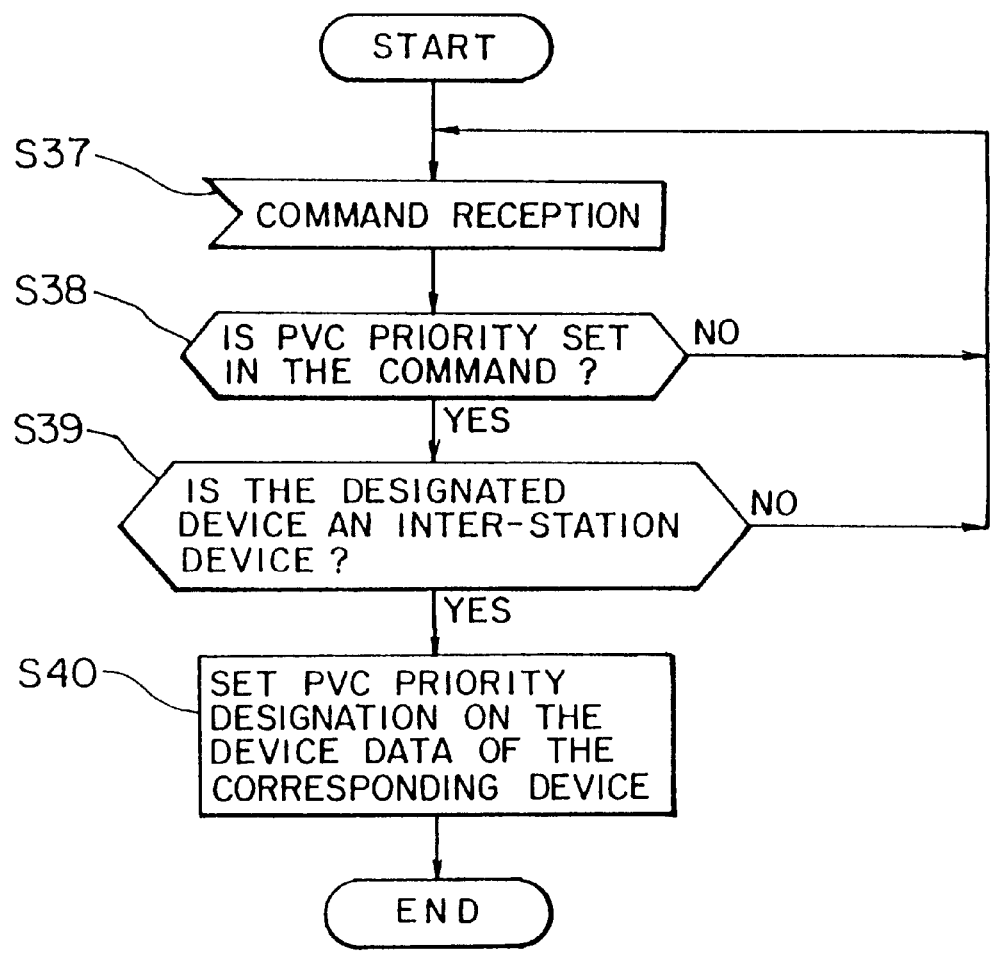
FIG. 22 is a flowchart used for explaining the PVC path control process in an ATM exchange according to the present invention.

At this time, the main control device 4, as shown in FIG. 22, judges whether or not a received command is a PVC priority command to set preferentially PVC priority (steps S37 and S38). If the received command is a PVC priority command, the received command is reported to the device management unit 43 via the priority command reception unit 402.

Figure 23:
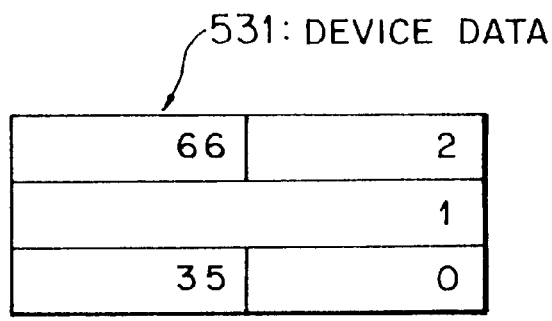
FIG. 23 is a diagram showing a specific example of device data according to the present invention.
Figure 24:
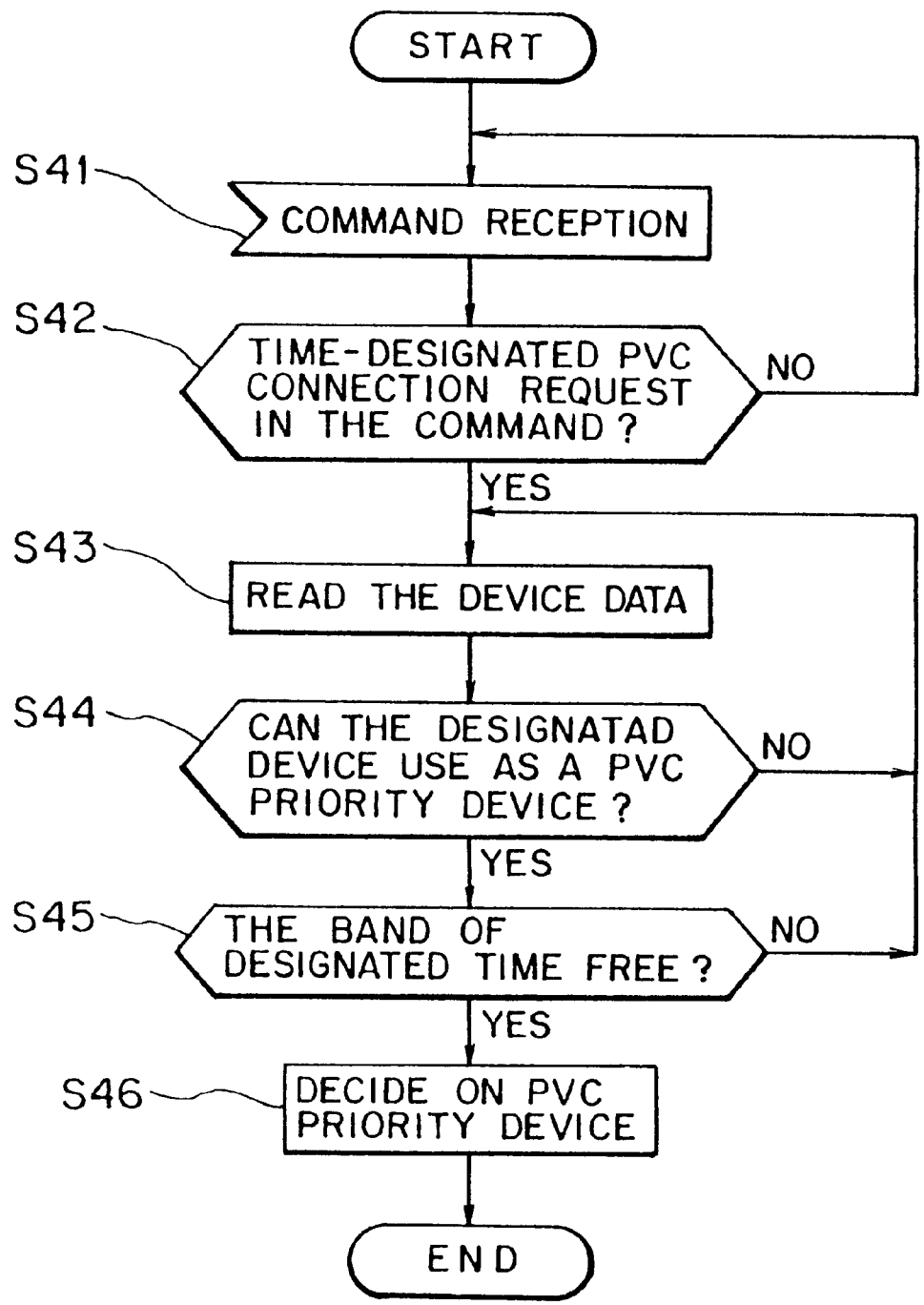
FIG. 24 is a flowchart used for explaining the PVC path control process in an ATM exchange according to the present invention.

The device management unit 43 analyzes data within the received PVC priority command and then judges whether or not a device designated by the PVC priority command is an intra-station device (NNI) or common device (from step S38 to step S39 via YES route). If the designated device is an intra device (NNI) or common device, the device data 531 regarding the corresponding device (e.g. the interface shelf 7 and interface device (OC3c) 8A, 8B) is stored in the device data storage unit 53 of the main storage device 5, for example, as shown in FIG. 23, whereby PVC priority is set (from step S39 to step S40 via YES route).

When the received command is not a PVC priority command in the step S38 or when the designated device to which PVC priority is set is not an intra-station device in the step S39, the device management unit 43 does not perform a PVC priority setting (NO route in steps S38 and S39).

Thereafter, for example, when an operator of the ATM exchange 1 enters a PVC connection request command and the command reception unit 40 (reservation command reception unit 401) receives the command (step S41), the PVC path connection management unit 41 in the main control device 4 analyzes data within the received command, thus judging whether or not there is time designation (set time/open time) of a PVC path (step S42).

As a result, when there is no time designation, the PVC path setting control which uses the PVC priority device is not performed (NO route in step S42). However, when there is time designation, the PVC path connection management unit 41 refers to the device data 531 in the device data storage unit 53 via device management unit 43 (from step S42 to step S43 via YES route), thus judging whether or not the designated device is set as a PVC priority device (step S44).

As a result, if the designated device is set as PVC priority, the PVC path connection management unit 41 further judges whether or not the band of the device at the PVC path set time/open time is free by a using band (140 Mbps) (from step S44 to step S45 via YES route). If yes, the device is decided as a device preferentially used at a PVC path setting time (step S46).

Thereafter, as described in the items (1) and (2), the PVC connection management unit 42 judges whether or not the current time is the PVC path open time (14:00) by referring to data in the time connection management data storage unit 52 within the main storage device 5 at constant time intervals (in units of minute). At the open time, the path connection control unit 44 is automatically activated to set a PVC path using the PVC priority device (or path), based on the device data 531 in the device data storage unit 53.

Further, the PVC connection management unit 42 judges whether or not the current time is the PVC path open time (14:00) by referring to data in the PVC connection reservation data storage unit 51 within the main storage device 5 at constant time intervals. At the open time, the path connection control unit 44 is automatically activated to open a PVC path using the above-mentioned PVC priority device (or path).

When an SVC command that sets an SVC path is received via the SVC command reception unit 403 in the command reception unit 40, the path connection control unit 44 in the main control device 4 sets an SVC route at an SVC setting time, based on the device data 531 in the device data storage unit 53 within the main storage device 5, without using the PVC priority device (or path).

As described above, according to the ATM exchange 1, priority information is preset to a specific device between the subscriber terminals 2 to which a PVC path is set while a PVC priority device (or path) preferentially used at a PVC path setting time is set. When a PVC path is actually set, the PVC priority device is used. Hence, a PVC path can be certainly set by reserving a usable device or path without conflicting with a path setting (here, an SVC path setting) different from the PVC path setting.

When a reservation command respectively designating the subscriber terminals 2 to which a PVC path is to be set, the set time/open time of a PVC path, and using band is received after previously setting the PVC priority device as described above, the PVC priority device in which the band at the set time/open time is left equal to or larger than the using band is selected. When the PVC path set time comes, a PVC path using the PVC priority device is automatically set. Hence, a PVC path can be certainly set in a designated time slot while a conflict with the setting of a path (such as SVC path) different from the PVC can be effectively avoided.

Since the PVC priority device is prevented from being used at the SVC path setting time, it can be certainly avoided that the PVC path cannot be set because of a conflict between the SVC setting and the PVC setting.

(4) The case where the PVC priority device (or path) is automatically set:

Next, the process in which a device or path preferentially used at a PVC path setting time is automatically set and the PVC priority device (or path) is used at an actual PVC path setting time will be described below in detail using the flowcharts (steps S47 to S57) shown in FIGS. 25 and 26.

In this case, an operator of the ATM exchange 1 first enters a PVC connection request command designating the data shown in FIG. 10 to the ATM exchange 1 via the Ethernet network 13 by means of the maintenance and operation management control device 12.

Figure 25:
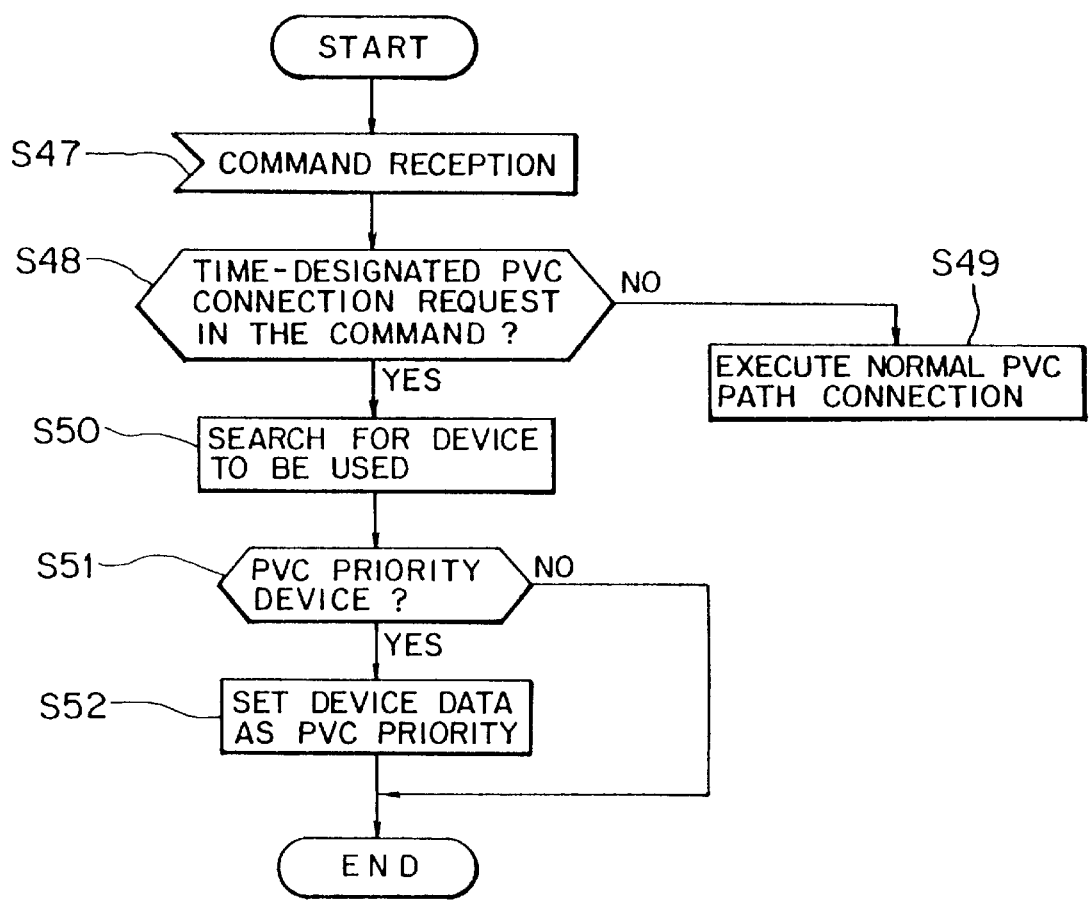
FIG. 25 is a flowchart used for explaining the PVC path control process in an ATM exchange according to the present invention.

As shown in FIG. 25, when the command reception unit 40 (the reservation command reception unit 401) in the main control device 4 receives the PVC connection request command (step S47), the reservation data management unit 411 in the PVC path connection management unit 41 within the main control device 4 analyzes data in the received command, thus judging whether or not there is the time designation (set time/open time) of the PVC path (step S48).

As a result, when there is no time designation, the path connection control unit 44 executes as usual a PVC path setting at the command receiving time (from step S48 to step S49 via NO route). As described in the items (1) and (2), when there is time designation, the PVC path connection management unit 41 searches for a device (or path) between the subscriber terminals 2 usable at the set time/open time, based on the PVC connection reservation data 511 in the PVC connection reservation data storage unit 51 (step S48 to step S50 via YES route).

In concrete, the PVC path connection management unit 41 first selects arbitrarily a device or path between the designated subscriber terminals 2, based on the PVC connection reservation data 511 in the PVC connection reservation data storage unit 51 and then judges whether or not the selected interface device has been already set as a PVC priority device (or path), based on the device data 531 already registered in the device data storage unit 53 (step S51).

As a result, if the selected interface device is not set as a PVC priority device, it is decided as a device usable at the PVC path setting time. This device is automatically set as a PVC priority device by means of the device management unit 43 and the device data storage unit 53 stores the data (device data 531) (step S51 to step S52 via YES route).

In the step S51, when the selected device or path has already been set as a PVC priority device, the process of the PVC path connection management unit 41 completes (YES route in step S51).

Thereafter, in this case, in the main control device 4, the PVC connection management unit 42 refers to data in the time connection management data storage unit 52 within the main storage device 5 at constant time intervals (in units of minute) and then verifies that the current time is a PVC path set time. At the set time, the route connection control unit 44 is automatically activated to set a PVC path using the PVC priority device (or path) designated on the device data storage unit 53.

Figure 26:
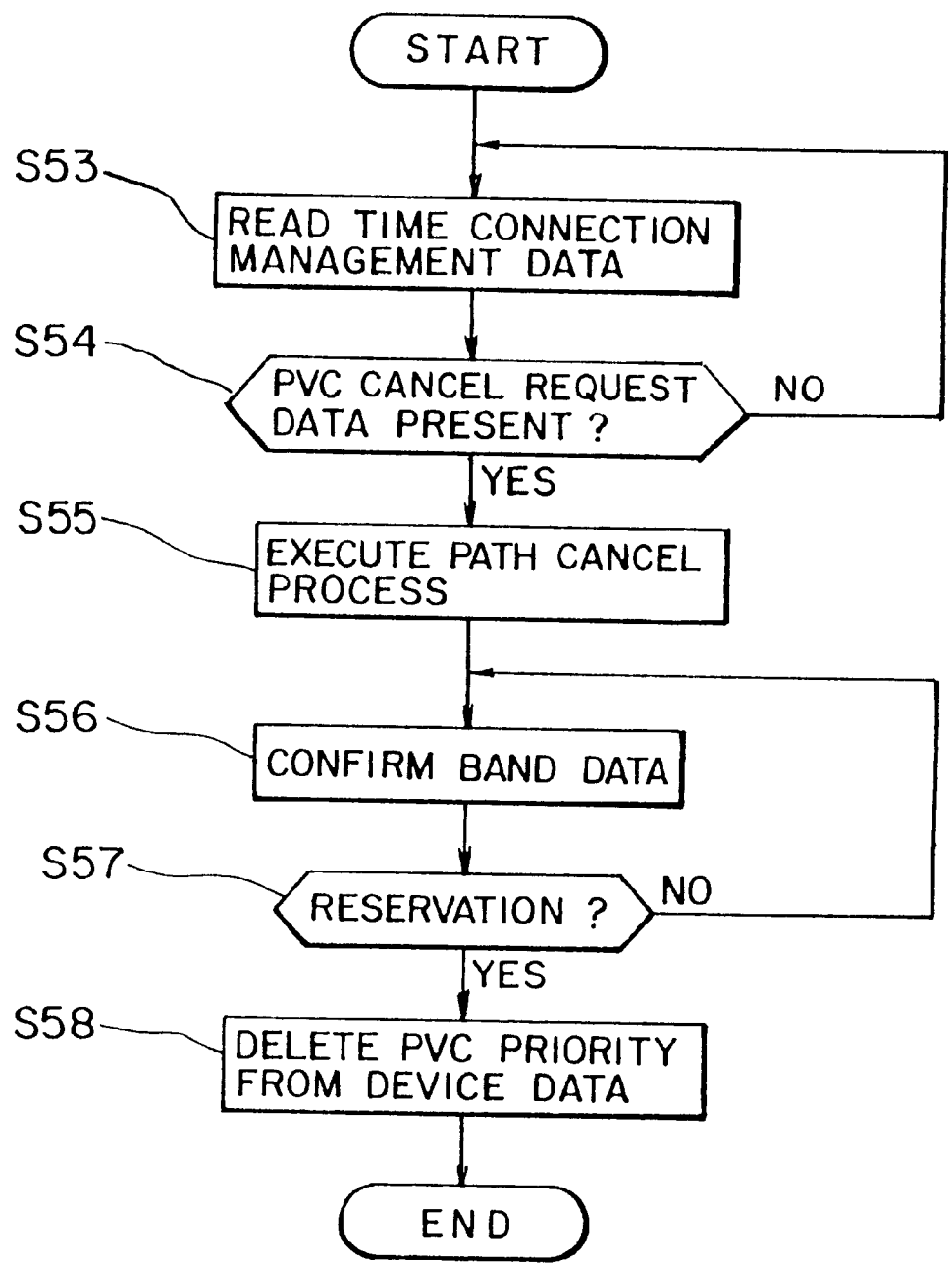
FIG. 26 is a flowchart used for explaining the PVC path control process in an ATM exchange according to the present invention.

Subsequently, as shown in FIG. 26, the main control device 4 refers to time connection management data in the time connection management data storage unit 52 within the main storage device 5 at constant time intervals by means of the PVC connection management unit 42 (step S53) and then judges whether or not there is open request data (an open time is set) (step S54). If no, the PVC connection management unit 42 refers to another data (No route in step S54). If there is open request data while the current time is the open time of the PVC path, the PVC path connection management unit 41 is activated.

The PVC path connection management unit 41 searches for a PVC path to be opened based on the time connection management data 521 in the time connection management data storage unit 52 to activate the path connection control unit 44 and then opens automatically the PVC path using the PVC priority device described above (step S55).

In such a manner, in the device management unit 43, when the PVC path using the PVC priority device is opened, the reserved band judgment unit 431 judges whether or not there is another use reservation for the band of the PVC priority device (or path) (step S57). If there is another use reservation, the priority setting of the PVC priority device is not canceled (NO route in step S57). If there is no other use reservation, the corresponding device data 531 in the device data storage unit 53 is deleted. Thus, the PVC device is returned to its normal priority/non-priority state by canceling the priority setting of the PVC priority device (step S58).

In this case, when an SVC command setting an SVC path is received via the SVC command reception unit 403 in the command reception unit 40, the path connection control unit 44 in the main control device 4 sets the SVC path at the SVC setting time, based on the device data 531 in the device data storage unit 53 within the main storage device 5, without using the PVC priority device.

As described above, according to the ATM exchange 1, a PVC path can be automatically set as a PVC priority device preferentially used at a PVC path setting time by searching for a device or path in which the band at the start time/open time of setting a PVC path is left equal to or larger than a using band. Hence, the PVC path can be set by setting the PVC priority without a special command to set PVC priority. Further, the burden on the PVC path setting a process can be reduced.

In this case, since setting a PVC path using the PVC priority device (or path) is automatically canceled at a PVC path opening time, it is unnecessary to perform the procedure (such as a command entry) to cancel the PVC path setting. Hence, the burden such as work of controllably canceling the PVC path by an operator can be significantly reduced.

Further, when the PVC path is opened, it is judged whether or not there is another use reservation for the band of the PVC priority device. If there is another use reservation, the PVC priority setting is not canceled. If there is no other use reservation, the PVC priority setting is canceled. The device or path corresponding to use reservation left in the band can be set as PVC priority designation. The influence on another path setting (e.g. SVC path setting) according to PVC priority designation can be suppressed to a minimum.

When the SVC path is set, the device or path with PVC priority is not used. Hence, it can be certainly prevented that the conflict between the SVC path setting and the PVC path setting makes it difficult to set a PVC path.

(5) Threshold of PVC priority designation:

In the above-described items (3) and (4), PVC priority designation cannot be set limitlessly. Hence, by handling as a threshold the upper limit value such as the maximum number of devices or the maximum number of paths in the common unit to which priority is previously taken, the data (in this case, the maximum number of paths), for example, shown in FIG. 28, is set in the threshold storage unit 55 in the main storage device 5.

Figure 27:
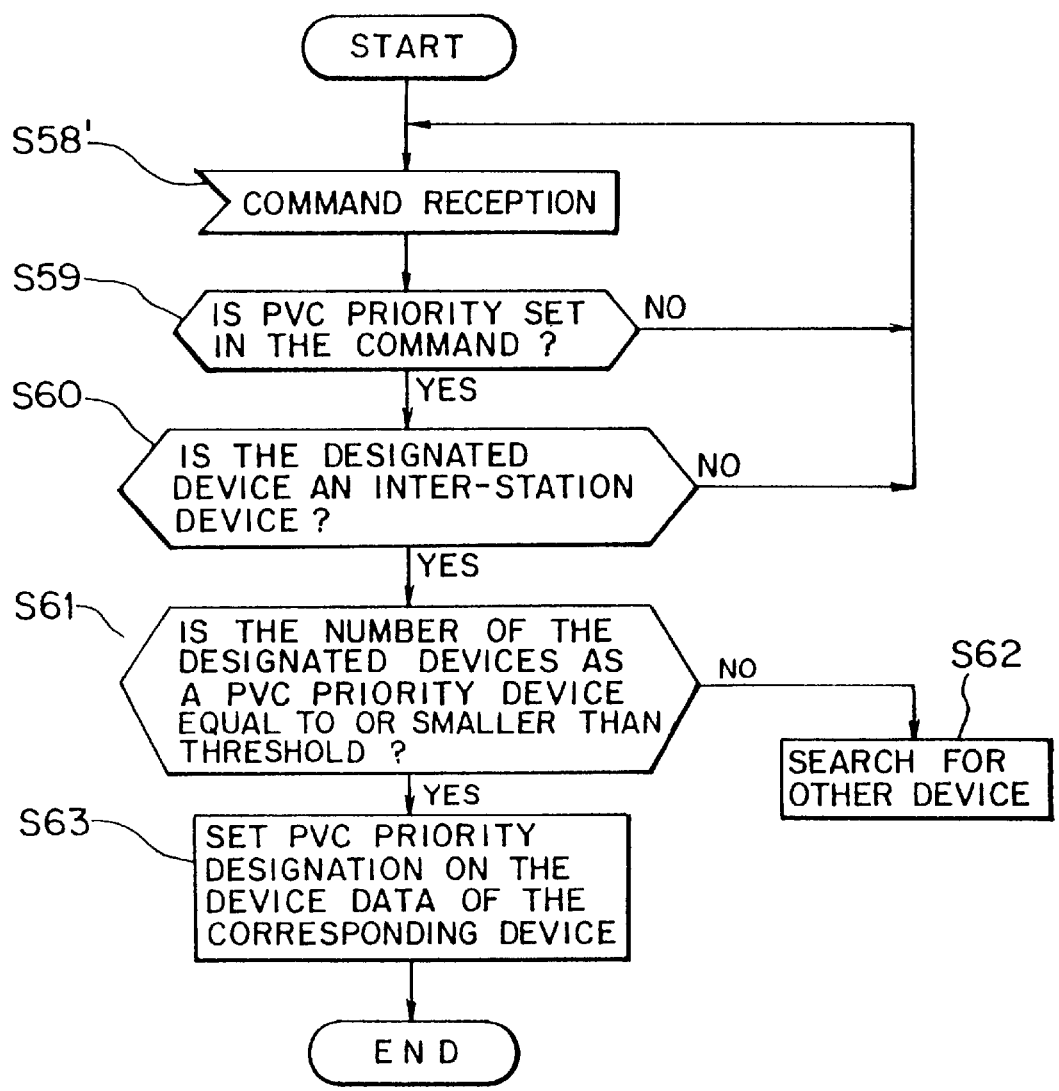
FIG. 27 is a flowchart used for explaining the PVC path control process in an ATM exchange according to the present invention.

In such a manner, as shown in FIG. 27, when the command reception unit 40 receives a PVC priority designation indication command (step S58') and the device management unit 43 sets a new PVC priority path (or device) (YES route in steps S59 and S60), the device management unit 43 reads out the threshold of the threshold storage unit 55 and then judges whether or not the PVC priority path of the corresponding device reaches the maximum number of paths previously set (step S61).

As a result, if the PVC priority path reaches the maximum number of paths (exceeds the threshold), no path connection reservation is permitted. Then the device management unit 43 searches for another device of which the PVC priority path does not reach the maximum number of paths (step S61 to step S62 via NO route). If the PVC priority path does not reach the maximum number of paths (equal to or smaller than the threshold), the device management unit 43 sets new PVC priority to the device data 531 of the corresponding device (step S63).

In such a manner, according to the ATM exchange 1, an upper limit value is set to the number of devices or paths to which a PVC priority can be set. The PVC priority setting is executed so as to set the number of devices or paths to which PVC priority can be set to equal to or smaller than the upper limit value. Hence, the influence on another path setting (e.g. SVC path setting) can be certainly suppressed to a minimum.

As described above in detail, according to the private line connection controlling method in a fixed-length cell handling-type exchange and the fixed-length cell handling-type exchange of the present invention, since a private line connection can be automatically set for a period, based on the period of a private line connection and designated private line reservation information, the procedure of setting or canceling the private line connection to the exchange is not needed at the time the private line connection is actually set or canceled. Thus, for example, it is not needed that an operator in charge of maintenance and operation of an exchange is involved in the job for setting/canceling a private line connection on 24-hour basis. The burden can be greatly reduced.

In concrete, the period may be designated with the set start time and the set end time of a private line connection or may be designated with the set start time of a private line connection and the period lapsed from the set start time. Hence, the time band in which a private line connection is set can be reserved and set very easily.

According to the private line connection controlling method in a fixed-length cell handling-type exchange and the fixed-length cell handling-type exchange of the present invention, a usable route is previously decided in the period based on the private line connection reservation information respectively designating subscriber terminals to which a private line connection is to be set, a period of a private line connection and a using band. Then, the private line connection is automatically set using the decided route and using band at the start time of the period. Hence, at the time of setting a private line connection, it does not occur that the private line connection cannot be set because a route to be used cannot be used due to a shortage of band. The private line connection can be surely set at all times in a desired time zone.

At that time, the decided route described above is decided by first selecting an arbitrarily route between the designated subscriber terminals, judging whether or not there is a use reservation for another private line connection in the selected route, and then judging whether or not the band in the period of the selected route is left equal to or larger than a necessary band (using band). Hence, for example, an operator which sets a private line connection to an exchange can reserve and set a private line connection without being conscious of information regarding to what extent which band is left in which route. The burden on an operator can be more reduced at the time of reserving and setting a private line connection.

When the band in the period of the selected route is not left equal to or larger than a necessary band, a usable route can be automatically decided by selecting another route and performing the same judging process as that described above. Hence, there is almost no case where a private line connection cannot be set because of no usable routes (claims 8 and 32).

Further, the setting of the private line connection is automatically canceled at the end time of the period, it is not needed to perform the procedure of canceling a private line connection (such as a command entry procedure by an operator). Further, the burden on an operator in charge of a private line connection setting/canceling control can be reduced. Since undesired private line connection reservation information is deleted from the storage unit after canceling the private line connection, the private line connection setting/canceling control can be accurately continued while the capacity of the storage unit can be suppressed to a minimum.

Further, according to the private line connection controlling method in a fixed-length cell handling-type exchange and the fixed-length cell handling-type exchange of the present invention, an interface unit or path usable at the time of setting a private line connection is previously decided based on the private line connection reservation information respectively designating subscriber terminals to which a private line connection is to be set, a period of the private line connection and a using band. Thus, when the start time of the period comes, the private line connection using the above-decided interface unit, path and the using band is automatically set. Hence, it does not occur that a private line connection cannot be set because an interface unit or path to be used at the time of a private line connection setting operation such as a command entry cannot be used due to a shortage of the band. The private line connection can be surely set at all times in a desired time zone.

At that time, the decided interface unit or path is decided by first selecting an arbitrary interface unit or path between the designated subscriber terminals, judging whether or not there is a use reservation for another private line connection to the selected interface unit or path, and then judging whether or not the band in the period of the selected interface unit or path is left equal to or larger than a necessary band (using band). Hence, for example, an operator who sets a private line connection to an exchange can reserve and set the private line connection without being conscious of information regarding to what extent which band is left in which interface unit or path. In this case, the burden on an operator can be reduced at the time of reserving and setting a private line connection.

When the band in the period of the selected interface unit or path is not left equal to or larger than a necessary band, a usable interface unit or path can be automatically set by selecting another interface unit or path and then performing the same judging process as that described above. In this case, there is almost no case where a private line connection cannot be set because of no usable interface unit or path.

In this case, since the private line connection setting is automatically canceled at the end time of the period, it is not needed to cancel the operation of a private line connection (such as a command entry operation by an operator). Further, the burden on an operator in charge of a private line connection setting/canceling control can be reduced while undesired private line connection reservation information is deleted from the storage unit after canceling the setting of the private line connection. Hence, private line connection setting/canceling control can be accurately continued while the capacity of the storage unit can be suppressed to a minimum.

Further, according to the private line connection controlling method in a fixed-length cell handling-type exchange and the fixed-length cell handling-type exchange of the present invention, a priority route to be used preferentially at a private line connection setting time is set by previously setting priority information to a certain route between subscriber terminals to which a private line connection is set. Then when the private line connection is set actually, a route to which the priority information is set is preferentially used. Therefore, a usable route can be certainly reserved to set a private line connection with no conflict with a line connection setting different from the private line connection.

As described above, after the priority setting of a private line connection is performed by previously setting priority information, a priority route in which the band in the period is left equal to or larger than a using band is selected in response to a command designating subscriber terminals to which a private line connection is to be set, a period of the private line connection and a using band. When the set start time of the period comes, the private line connection using the above-mentioned priority route is automatically set. Hence, the conflict in setting a line connection different from the private line connection can be effectively avoided while the private line connection can be surely set in a designated time slot.

Further, according to the private line connection controlling method in a fixed-length cell handling-type exchange and the fixed-length cell handling-type exchange of the present invention, it is prevented that a priority route to which priority information is set is used at the event of setting a public line connection. Hence, the case where the private line connection cannot be set by conflicting the public line connection setting with the private line connection setting can be surely prevented.

Further, according to the private line connection controlling method in a fixed-length cell handling-type exchange and the fixed-length cell handling-type exchange of the present invention, a route in which the band in the period for a private line connection is left equal to or larger than a using band can be decided as a usable route while the route can be automatically set as a priority route preferentially used at the time of setting a private line connection. Hence, a private line connection can be set by setting a priority route used at the time of connecting the private line, without using a special command to set a priority route. Thus, the burden in the private line connection setting process can be more reduced.

Since the private line connection setting using the above-mentioned priority route is automatically canceled at the end time of the period, it is not required to perform the operation (such as a command entry) to cancel the private line connection setting. Hence, the burden such as the job at which an operator cancels and controls the private line connection can be greatly reduced.

When the above-mentioned private line connection setting is canceled, it is judged whether or not there is another use reservation for the band of the priority route. If there is another use reservation, the priority information set to the priority route is not canceled. If there is no other use reservation, the priority information is canceled. Therefore, the route corresponding to use reservation left in the band can be preferentially designated. The influence on setting another line connection due to the priority designation can be suppressed to a minimum.

Further, in this case, the influence on another line connection setting can be more surely suppressed to a minimum when the number of priority routes to which the priority information can be set is set to the upper limit value and the control unit sets the priority information to be equal to or smaller than the upper limit value of the number of priority routes.

Further, according to the private line connection controlling method in a fixed-length cell handling-type exchange and the fixed-length cell handling-type exchange of the present invention, the priority route to which priority information is set is not used when the public line connection is set. Hence, the case where the private line connection setting becomes impossible because of the conflict between the public line connection setting and the private line connection setting can be surely prevented.

What is claimed is:

1. A private line connection controlling method for a fixed-length cell handling-type exchange including an exchange switching unit for setting a private line connection between designated ones of plural subscriber terminals and a control unit for controlling the exchange switching unit with respect to setting of the private line connection, said method comprising the steps of receiving a setting command including private line connection reservation information by the exchange, said private line connection reservation information designating subscriber terminals, between which a prospective private line connection is to be set, and a connection period of said prospective private line connection; and based on said private line connection reservation information of the received setting command, setting a private line connection between the designated subscriber terminals by the exchange switching unit under the automatic control of the control unit.

2. The private line connection controlling method in a fixed-length cell handling-type exchange according to claim 1, wherein said period is designated by a set start time and a set end time for said private line connection.

3. The private line connection controlling method in a fixed-length cell handling-type exchange according to claim 1, wherein said period is designated by a set start time for said private line connection and an elapsed time from said set start time.

4. A private line connection controlling method for a fixed-length cell handling-type exchange including an exchange switching unit for setting a private line connection between designated ones of plural subscriber terminals and a control unit for controlling the exchange switching unit with respect to setting of the private line connection, said method comprising the steps of:

receiving a canceling command including private line connection reservation information by the exchange, said private line connection reservation information designating subscriber terminals, from which a current private line connection is to be canceled, and a set end time for said current private line connection between the designated subscriber terminals or an elapsed time from a set start time of said current private line connection; and based on said private line connection reservation information of the received canceling command, canceling said current private line connection between the designated subscriber terminals at said set end time or after said elapsed time by the exchange switching unit under the automatic control of the control unit.

5. A private line connection controlling method for a fixed-length cell handling-type exchange including an exchange switching unit for setting a private line connection between a plurality of subscriber terminals and a control unit for the exchange switching unit with respect to setting of the private line connection, said method comprising the steps of:

receiving a setting command including private line connection reservation information by the exchange, said private line connection reservation information designating subscriber terminals, between which a prospective private line connection is to be set, a connection period of said prospective private line connection, and a using band to be used for said prospective private line connection;

based on said private line connection reservation information of the received setting command, determining an available route as said prospective private line connection between the designated subscriber terminals by the control unit of the exchange; and subsequently when the start time of said connection period comes on, setting said current private line connection using the determined available route and the designated using band during said connection period by the exchange switching unit under the automatic control of the control unit.

6. The private line connection controlling method in a fixed-length cell handling-type exchange according to claim 5, wherein said control unit selects arbitrarily a route between said designated subscriber terminals, judges whether or not there is a use reservation for another private line connection to said selected route based on said private line connection reservation information, and decides said selected route as said usable route if there is no other use reservation.

7. The private line connection controlling method in a fixed-length cell handling-type exchange according to claim 5, wherein said control unit selects arbitrarily a route between said designated subscriber terminals, judges whether or not there is a use reservation for another private line connection to said selected route, further judges whether or not a usable band in said period of said selected route is left equal to or larger than said using band if there is another use reservation, based on said private line connection reservation information, and decides said selected route as said usable route if the usable band is left equal to or larger than said using band.

8. The private line connection controlling method in a fixed-length cell handing-type exchange according to claim 7, further comprising the step of selecting a route other than said selected route when the usable band of said selected route in said period is less than said using band and then trying a step for deciding said usable route again.

9. The private line connection controlling method in a fixed-length cell handing-type exchange according to claim 5, further comprising the step of automatically canceling said private line connection set via said exchange switching unit when the end time of said period comes, based on said private line connection reservation information.

10. The private line connection controlling method in a fixed-length cell handling-type exchange according to claim 9, further comprising the steps of providing said exchange with a storage unit and storing in said storage unit said private line connection reservation information, and deleting by said control unit a corresponding private line connection reservation information in said storage unit when said private line connection is canceled.

11. A private line connection controlling method for a fixed-length cell handling-type exchange including an exchange switching unit for setting a private line connection between a plurality of subscriber terminals, via a plurality of interface units, and a control unit for controlling the exchange switching unit and the interface units with respect to setting of the private line connection, said method comprising the steps of:

receiving a setting command including private line connection reservation information by the exchange, said private line connection reservation information designating subscriber terminals, between which a prospective private line connection is to be set, a connection period of said prospective private line connection, and a using band to be used for said prospective private line connection;

based on said private line connection reservation information of the received setting command, determining an available one of said interface units and an available path as said prospective private line connection between the designated subscriber terminals by the control unit of the exchange; and subsequently when the start time of said connection period comes, setting said current private line connection using the determined available interface unit and the determined available path during said connection period by the exchange switching unit under the automatic control of the control unit.

12. The private line connection controlling method in a fixed-length cell handling-type exchange according to claim 11, wherein said control unit selects arbitrarily an interface unit and path between said designated subscriber terminals, judges whether or not there is a use reservation to set another private line connection to the selected interface unit and the selected path, based on said private line connection reservation information, and decides said selected interface unit as said usable interface and said selected path as said usable path if there are no other use reservations.

13. The private line connection controlling method in a fixed-length cell handling-type exchange according to claim 12, wherein said control unit selects arbitrarily an interface unit and a path between said designated subscriber terminals, judges whether or not there is a use reservation for another private line connection to the selected interface unit and the selected path, further decides whether or not the usable band in said period of said selected interface unit and said selected path is left equal to or larger than said using band when there is another use reservation based on said private line connection reservation information, and decides said selected interface unit as said usable interface unit and said selected path as said usable path if the usable band is left equal to or larger than said using band.

14. The private line connection controlling method in a fixed-length cell handling-type exchange according to claim 13, further comprising the steps of selecting an interface unit other than said selected interface unit and a path other than said selected path when the usable band of said selected interface unit and the usable band of said selected path in said period is less than said using band and then trying a step for deciding said usable interface unit and said usable path again.

15. The private line connection controlling method in a fixed-length cell handling-type exchange according to claim 11, wherein said control unit automatically cancels said private line connection via said exchange switching unit based on said private line connection reservation information when the end time of said period comes.

16. The private line connection controlling method in a fixed-length cell handling-type exchange according to claim 15, further comprising providing said exchange with a storage unit and storing in said storage unit said private line connection reservation information, and deleting by said control unit corresponding private line connection reservation information in said storage unit when said private line connection is canceled.

17. A private line connection controlling method for a fixed-length cell handling-type exchange including an exchange switching unit for setting a private line connection between a plurality of subscriber terminals, via a plurality of interface units, and a control unit for controlling the exchange switching unit and the interface units with respect to setting of the private line connection, said method comprising the steps of:

assigning priority information for prospective setting of a route to be used by preference;

receiving a setting command having said priority information by the exchange; and setting a private line connection, using the preferred route for which said priority information of the received setting command is assigned, by the exchange switching unit under the control of the control unit.

18. The private line connection controlling method in a fixed-length cell handling-type exchange according to claim 17, further comprising receiving a command having private line connection reservation information designating subscriber terminals to which said private line connection is to be set, a period of said private line connection to be set between said subscriber terminals and a using band at the time of setting said private line connection, selecting by said control unit said priority route where the band in said period is left equal to or larger than said using band, based on said private line connection reservation information, and then automatically setting by said control unit said private line connection using said priority route and said using band between said designated subscriber terminals when the set start time of said period comes.

19. The private line connection controlling method in a fixed-length cell handling-type exchange according to claim 18, wherein said control unit automatically cancels said private line connection using said priority route and said using band, based on said private line connection reservation information, when the end time of said period comes.

20. The private line connection controlling method in a fixed-length cell handling-type exchange according to claim 19, wherein said control unit judges whether or not there is another use reservation in the band of said priority route when said private line connection is canceled, does not cancel said priority information set to said priority route if there is another use reservation, and cancels said priority information set to said priority route if there are no other use reservations.

21. The private line connection controlling method in a fixed-length cell handling-type exchange according to claim 17, wherein an upper limit value is set to the number of priority routes to which said priority information can be set, and that said control unit sets said priority information such that the number of said priority routes is equal to or smaller than said upper limit value.

22. A private line connection controlling method for a fixed-length cell handling-type exchange including an exchange switching unit for setting a private line connection or a public line connection between a plurality of subscriber terminals via a plurality of interface units, and a control unit for controlling the exchange switching unit and the interface units with respect to setting of the private line connection, said method comprising the steps of:

assigning priority information for prospective setting of a route to be used by preference;

receiving a setting command having said priority information by the exchange;

setting a private line connection, using the preferred route for which said priority information of the received setting command is assigned, by the exchange switching unit under the control of the control unit; and inhibiting use of said preferred route when the public line connection is to be set.

23. A private line connection controlling method for a fixed-length cell handling-type exchange including an exchange switching unit for setting a private line connection or a public line connection between a plurality of subscriber terminals via a plurality of interface units, and a control unit for controlling the exchange switching unit and the interface units with respect to setting of the private line connection, said method comprising the steps of:

receiving a setting command having private line connection reservation information by the exchange, said private line connection reservation information designating subscriber terminals, between which a prospective private line connection is to be set, a period of said prospective private line connection to be set between said subscriber terminals and a using band to be used for said prospective private line connection;

based on said private line connection reservation information of the received setting command, deciding a route whose remaining band is equal to or more than the designated using band in the designated period as an available route for said prospective private line connection by the control unit;

setting the decided route as a priority route to be used for said prospective private line connection by the control unit; and subsequently when the start time of the designated period comes, setting said private line connection, using the decided priority route and the designated using band, between the designated subscriber terminals by the exchange switching unit under the automatic control of the control unit.

24. The private line connection controlling method in a fixed-length cell handling-type exchange according to claim 23, wherein said control unit cancels automatically said private line connection using said priority route and said using band, based on said private line connection reservation information, when the end time of said period comes.

25. The private line connection controlling method in a fixed-length cell handling-type exchange according to claim 24, wherein said control unit judges whether or not there is another use reservation in the band of said priority route when said private line connection is canceled, does not cancel said priority information set to said priority route if there is another use reservation, and cancels said priority information set to said priority route if there is no other use reservation.

26. The private line connection controlling method in a fixed-length cell handling-type exchange according to claim 23, wherein an upper limit value is set to the number of priority routes to which said priority information can be set, and that said control unit sets said priority information such that the number of said priority routes is equal to or smaller than said upper limit value.

27. A private line connection controlling method for a fixed-length cell handling-type exchange including an exchange switching unit for setting a private line connection or a public line connection between a plurality of subscriber terminals via a plurality of interface units, and a control unit for controlling the exchange switching unit and the interface units with respect to setting of the private line connection, said method comprising the steps of:

receiving a setting command having private line connection reservation information by the exchange, said private line connection reservation information designating subscriber terminals between which a prospective private line connection is to be set, a period of said private line connection to be set, and using a band for said prospective private line connection;

based on said private line connection reservation information of the received setting command, deciding a route whose remaining band is equal to or more than the designated using band as an available route for said prospective private line connection by the control unit of the exchange;

assigning priority information for a priority route to be used by preference by the control unit; and inhibiting said priority route from being used for the public line connection.

28. A fixed-length cell handling-type exchange comprising an exchange switching unit for setting a private line connection between designated ones of plural subscriber terminals, a control unit coupled to said exchange switching unit for controlling the exchange switching unit with respect to setting the private line connection and a storage unit coupled to and provided for said control unit;

said storage unit including:
a reservation information storage unit for storing a setting command including private line connection reservation information by the exchange said private line connection reservation information designating subscriber terminals between which a prospective private line connection is to be set, and a connection period of said prospective line connection; and said control unit including:
a command reception unit for receiving a setting command including said private line connection reservation information,
a reservation information management unit for storing said private line connection reservation information received by said command reception unit into said reservation information storage unit of said storage unit, a time information confirming unit for confirming said period by referring to said reservation information storage unit at constant time intervals, and a private line connection control unit for automatically controlling the setting or canceling of said private line connection between said designated subscriber terminals via said exchange switching unit, based on said private line connection reservation information of the received setting command stored in said reservation information storage unit, according to a confirmation result of said period by said time information confirming unit.

29. The fixed-length cell handling-type exchange according to claim 28, wherein said private line connection control unit automatically sets said private line connection between said designated subscriber terminals via said exchange switching unit, based on said private line connection reservation information in said reservation information storage unit, when said time information confirming unit confirms a start time of said period, and then cancels automatically said private line connection set between said designated subscriber terminals via said exchange switching unit, based on said private line connection reservation information in said reservation information storage unit, when said time information confirming unit confirms an end time of said period.

30. A fixed-length cell handling-type exchange comprising an exchange switching unit for setting a private line connection between designated ones of plural subscriber terminals, a control unit coupled to said exchange switching unit for controlling the exchange switching unit, and a storage unit coupled to said control unit said storage unit including:
- a reservation information storage unit for storing a setting command including private line connection reservation information by the exchange, said private line connection reservation information designating subscriber terminals from which a current private line connection is to be canceled, and a set end time for said current private line connection between the designated subscriber terminals or an elapsed time from a set start time of said current private line connection having using band used at the time of setting said private line connection,
- a route information storage unit for storing route information on usable routes in said period of said private line connection, and
- a band information storage unit for storing using band information regarding usable routes in said period of said private line connection; and said control unit including:
- a command reception unit for receiving a command having said private line connection reservation information,
- a reservation information storage unit for storing the setting command including said private line connection reservation information received by said command reception unit into said reservation information storage unit of said storage unit,
- a route deciding unit for deciding a usable route between said designated subscriber terminals in said period, based on the setting command including said private line connection reservation information stored in said reservation information storage unit,
- a route information management unit for storing the route information on the route decided by said route deciding unit into said route information storage unit, together with said period;
- a band information management unit for storing using band information on the route decided by said route deciding unit into said band information storage unit, together with said period,
- a time information confirming unit for confirming said period by referring to said route information storage unit at constant time intervals, and
- a private line connection control unit for automatically setting the private line connection using the route decided by said route deciding unit and said using band between said designated subscriber terminals via said exchange switching unit, when said time information confirming unit confirms the start time of said period.

31. The fixed-length cell handling-type exchange according to claim 30, wherein said route deciding unit comprises:
- a route selecting unit for arbitrarily selecting a route between said designated subscriber terminals based on said private line connection reservation information stored in said reservation information storage unit of said storage unit;
- a reservation status judgment unit for judging whether or not there is already a use reservation for another private line connection in said selected route selected by said route selecting unit, based on said route information stored in said route information storage unit; and
- a remaining band judgment unit for judging whether or not the band in said period of said selected route selected in said route selecting unit is left equal to or larger than said using band based on said band information stored in said band information storage unit;

said selected route being decided as a route usable at the time of setting said private line connection when said reservation status judgment unit judges that there is no use reservation for another private line connection in said selected route or that there is a use reservation for another private line connection in said selected route and said remaining band judgment unit judges that there is a band in said period of said selected route is left equal to or larger than said using band.

32. The fixed-length cell handling-type exchange according to claim 31, wherein said route deciding unit decides another usable route to set the private line connection by selecting a route other than said selected route when said remaining band judgment unit judges that the band of said period of said selected route is left equal to or larger than said using band.

33. The fixed-length cell handling-type exchange according to claim 30, wherein said private line connection control unit cancels automatically said set private line connection via said exchange switching unit when said time information confirming unit confirms the end time of said period; and that said reservation information management unit deletes the corresponding private line connection reservation information in said reservation information storage unit of said storage unit when said private line connection control unit cancels said private line connection.

34. A fixed-length cell handling-type exchange comprising an exchange switching unit for setting a private line connection between a plurality of subscriber terminals via a plurality of interface units, a control unit for controlling said plurality of interface units and said exchange switching unit with respect to setting of the private line connection, and a storage unit coupled to said control unit said storage unit including:

a reservation information storage unit for storing a setting command including private line connection reservation information by the exchange, said private line connection reservation information designating subscriber terminals between which a prospective private line connection is to be set, a connection period of said prospective private line connection, and a using band to be used for said prospective private line connection;

an identification information storage unit for storing identification information inherent regarding a usable interface unit and path in said period of said private line connection, and a band information storage unit for storing using band information regarding a usable interface unit and path in said period of said private line connection; and said control unit including:

a command reception unit for receiving a command having said private line connection reservation information, a reservation information management unit for storing said private line connection reservation information received by said command reception unit into said reservation information storage unit of said storage unit, an interface unit and path deciding unit for deciding a usable interface unit and path when said private line connection is set between said designated subscriber terminals, based on the setting command including said private line connection reservation information stored in said reservation information storage unit, an interface unit and path information management unit for storing inherent identification information on the interface unit and path decided by said interface unit and path deciding unit, into said identification information storage unit, together with said period, a band information management unit for storing using band information on the interface unit and path decided by said interface unit and path deciding unit, into said band information storage unit, together with said period, a reservation information confirming unit for confirming said period by referring to said identification information storage unit at constant time intervals, and a private line connection control unit for setting automatically a private line connection using the interface unit and path decided by said interface unit and path deciding unit between said designated subscriber terminals via said exchange switching unit, when said reservation information confirming unit confirms a start time of said period.

35. The fixed-length cell handing-type exchange according to claim 34, wherein said interface unit and path deciding unit comprises:

an interface unit and path selecting unit for arbitrarily selecting an interface unit and path between said designated subscriber terminals based on said private line connection reservation information stored by said reservation information storage unit of said storage unit;

a reservation status judgment unit for judging whether or not there is already use reservation for another private line connection in the interface unit and path selected by said interface unit and path selecting unit, based on said identification information stored in said identification information storage unit; and a remaining band judgment unit for judging whether or not the band in the period of the interface unit and path selected in said interface unit and path selecting unit is left equal to or larger than said using band, based on said band information stored in said band information storage unit;

said selected interface unit and said selected path being decided as a usable interface unit and path at the time of setting said private line connection when said reservation status judgment unit judges that there is no use reservation for another private line connection in said selected interface unit and said selected path or that there is a use reservation for another private line connection in said selected interface unit and said selected path, and said remaining band judgment unit judges that a band in said period of said selected interface unit and said selected path is left equal to or larger than said using band.

36. The fixed-length cell handling-type exchange according to claim 35, wherein said interface unit and path deciding unit decides an interface unit and a path which are usable at the private line connection setting time by selecting an interface unit and path other than said selected interface unit and said selected path when said remaining band judgment unit judges that the band of each of said selected interface unit and said selected path is less than said using band.

37. The fixed-length cell handling-type exchange according to claim 34, wherein said private line connection control unit automatically cancels said set private line connection via said exchange switching unit when said time information confirming unit confirms the end time of said period and that said reservation information management unit deletes corresponding private line connection reservation information in said reservation information storage unit of said storage unit when said private line connection control unit cancels said private line connection.

38. A fixed-length cell handling-type exchange having an exchange switching unit for setting a private line connection between a plurality of subscriber terminals via a plurality of interface units, a control unit for the interface units with respect to setting of the private line connection exchange switching unit, and a storage unit for said control unit said storage unit including:

a priority information storage unit for storing priority information setting a route to be used preferentially at the time of setting said private line connection; and that said control unit including:

a priority command reception unit for receiving a priority command having said priority information, a priority information management unit for setting said priority information to said route based on said priority information received by said priority command reception unit and storing said priority route information on the priority route to which said priority information is set, into said priority information storage unit of said storage unit, and a private line connection control unit for setting said private line connection using said priority route, based on said priority route information in said priority information storage unit, when said private line connection is established between certain subscriber terminals.

39. The fixed-length cell handling-type exchange according to claim 38, wherein said priority information management unit includes a reservation band judgment unit for judging whether or not there are other use reservations for the band of said priority route when the setting of said private line connection using said priority route is canceled, said priority information management unit not canceling said priority information set to said priority route when said reservation band judgment unit judges that there are other use reservations for the band of said priority route while canceling said priority information set to said priority route when said reservation band judgment unit judges that there are no other use reservations for the band of said priority route.

40. The fixed-length cell handling-type exchange according to claim 38, wherein said storage unit includes an upper limit value storage unit that stores the upper limit value of the number of priority routes to which said priority information can be set, and that said priority information management unit sets said priority information so as to set the number of said priority routes to equal to or smaller than said upper limit value.

41. A fixed-length cell handling-type exchange comprising an exchange switching unit for setting a private line connection between a plurality of subscriber terminals via a plurality of interface units, a control unit for controlling the exchange switching unit and the interface units with respect to setting of the private line connection, and a storage unit coupled to said control unit, said storage unit including:
   a priority information storage unit for storing priority information setting a route to be used preferentially at the time of setting said private line connection;
   a reservation information storage unit for storing private line connection reservation information designating subscriber terminals to which said private line connection is to be set, a period of said private line connection to be set between said subscriber terminals, and a using band used at the time of setting said private line connection;
   a route information storage unit for storing route information on a route usable in said period of said private line connection; and
   a band information storage unit for storing using band information on a route usable in said period of said private line connection; and said control unit including:
   a priority command reception unit for receiving a priority command having said priority information,
   a priority information management unit for setting said priority information to said route based on said priority information received by said priority command reception unit and for storing said priority route information on said priority route and said priority information into said priority information storage unit of said storage unit,
   a reservation command reception unit for receiving a reservation command having said private line connection reservation information,
   a reservation information management unit for storing said private line connection reservation information received by said reservation command reception unit into said reservation information storage unit of said storage unit,
   a route deciding unit for deciding said priority route in which the band in said period is left equal to or larger than said using band, based on said private line connection reservation information in said reservation information storage unit and said priority information in said priority information storage unit, as a route usable at the time of setting said private line connection,
   a route information management unit for storing route information regarding said priority route decided by said route deciding unit into said route information storage unit, together with said period,
   a band information management unit for storing using band information on said priority route decided by said priority route deciding unit into said band information storage unit, together with said period,
   a time information confirming unit for confirming said period by referring to said route information storage unit at constant time intervals, and
   a private line connection control unit for automatically setting said private line connection using said priority route and said using band between said designated subscriber terminals when said time information confirming unit confirms the start time of said period.

42. The fixed-length cell handling-type exchange according to claim 41, wherein said private line connection control unit cancels automatically the setting of said private line connection when said time information confirming unit confirms an end time of said period.

43. The fixed-length cell handling-type exchange according to claim 41, wherein said priority information management unit includes a reservation band judgment unit that judges whether or not there are other use reservations in the band of said priority route when the setting of said private line connection using said priority route is canceled and that said priority information management unit does not cancel said priority information set to said priority route when said reservation band judgment unit judges that there are other use reservations in the band of said priority route or cancels said priority information set to said priority route when said reservation band judgment unit judges that there are no other use reservations in the band of said priority route.

44. The fixed-length cell handling-type exchange according to claim 41, wherein said storage unit includes an upper limit value storage unit that stores the upper limit value of the number of priority routes to which said priority information can be set, and that said priority information management unit sets said priority information so as to set the number of said priority routes to equal to or smaller than said upper limit value.

45. A fixed-length cell handling-type exchange comprising an exchange switching unit for setting a private line or a public line connection between a plurality of subscriber terminals via a plurality of interface units, a control unit for controlling said exchange switching unit and the interface units with respect to setting of the private line connection, and a storage unit coupled to said control unit, a priority information storage unit for storing priority information setting a route to be used preferentially at the time of setting said private line connection;
   a reservation information storage unit for storing private line connection reservation information designating subscriber terminals to which said private line connection is to be set, a period of said private line connection to be set between said subscriber terminals, and a using band used at the time of setting said private line connection;
   a route information storage unit for storing route information on a route usable in said period of said private line connection; and
   a band information storage unit for storing using band information on a route usable in said period of said private line connection; and said control unit including:

a public line connection setting command reception unit for receiving a public line connection setting command to set said public line connection, a priority command reception unit for receiving a priority command having said priority information, a priority information management unit for setting said priority information to said route based on said priority information received by said priority command reception unit and storing said priority route information on said priority route and said priority information into said priority information storage unit of said storage unit, a reservation command reception unit for receiving a reservation command having said private line connection reservation information, a reservation information management unit for storing said private line connection reservation information received by said reservation command reception unit into said reservation information storage unit of said storage unit, a route deciding unit for deciding said priority route in which the band in said period is left equal to or larger than said using band, based on said private line connection reservation information in said reservation information storage unit and said priority information in said priority information storage unit, as a route usable at the time of setting said private line connection, a route information management unit for storing route information on said priority route decided by said route deciding unit into said route information storage unit, together with said period, a band information management unit for storing using band information on said priority route decided by said priority route deciding unit into said band information storage unit, together with said period, a time information confirming unit for confirming said period by referring to said route information storage unit at constant time intervals, and a private line connection control unit for setting automatically said private line connection using said priority route and said using band between said designated subscriber terminals when said time information confirming unit confirms the start time of said period;

said private line connection control unit setting said public line connection between predetermined subscriber terminals without using said priority route, based on said priority route information in said priority information storage unit, when said public line connection setting command reception unit receives said public line connection setting command.

46. A fixed-length cell handling-type exchange comprising an exchange switching unit for setting a private line connection or a public line connection between a plurality of subscriber terminals, a control unit for controlling a plurality of interface units and said exchange switching unit and the interface units with respect to setting of the private line connection, and a storage unit coupled to said control unit said storage unit including:

a priority information storage unit for storing priority information setting a route to be used preferentially at the time of setting said private line connection;

a reservation information storage unit for storing private line connection reservation information designating subscriber terminals between which a prospective private line connection is to be set, a period of said prospective private line connection to be set between said subscriber terminals and a using band to be used for said prospective private line connection, a route information storage unit for storing route information on a route usable in said period of said private line connection, and a band information storage unit for storing using band information on a route usable in said period of said private line connection; and said control unit including:

a reservation command reception unit for receiving a reservation command having said private line connection reservation information, a reservation information management unit for storing said private line connection reservation information received by said reservation command reception unit into said reservation information storage unit of said storage unit, a route deciding unit for deciding a route between said designated subscriber terminals usable in said period, whose remaining band is equal to or more than the designated using band in the designated period as an available route for said prospective private line connection by the control unit, based on said private line connection reservation information in said reservation information storage unit, a priority information management unit for setting said priority information to said route decided by said route deciding unit and storing route information on said route and said priority information into said priority information storage unit in said storage unit, a route information management unit for storing route information on a priority route to which said priority information is set by said priority information management unit, into said route information storage unit of said storage unit, together with said period, a band information management unit for storing using band information on said priority route into said band information storage unit of said storage unit, together with said period, a time information confirming unit for confirming said period by referring to said route information storage unit at constant time intervals, and a private line connection control unit for setting automatically said private line connection using said priority route and said using band between said designated subscriber terminals when said time information confirming unit confirms the start time of said period.

47. The fixed-length cell handling-type exchange according to claim 46, wherein said private line connection control unit cancels automatically the setting of said private line connection using said priority route and said using band when said reservation information confirming unit confirms an end time of said period.

48. The fixed-length cell handling-type exchange according to claim 46, wherein said priority information management unit includes a reservation band judgment unit that judges whether or not there are other use reservations for the band of said priority route when said reservation information confirming unit confirms the end time of said period and said private line connection using said priority route and said using band is canceled; said priority information management unit not canceling said priority information set to said priority route when said reservation band judgment unit judges that there are other use reservations for the band of said priority route or canceling said priority information set to said priority route when said reservation band judgment unit judges that there are no other use reservations for the band of said priority route.

49. The fixed-length cell handling-type exchange according to claim 46, wherein said storage unit includes an upper limit value storage unit that stores an upper limit value of the number of priority routes to which said priority information can be set, and that said priority information management unit sets said priority information so as to set the number of said priority routes to equal to or smaller than said upper limit value.

50. A fixed-length cell handling-type exchange comprising an exchange switching unit for setting a private line connection or a public line connection between a plurality of subscriber terminals, a control unit for a plurality of interface units and said exchange switching unit, and storage unit for said control unit said storage unit including:
   a priority information storage unit for storing priority information setting a route to be used preferentially at the time of setting said private line connection;
   a reservation information storage unit for storing private line connection reservation information designating subscriber terminals between which a prospective private line connection is to be set, a period of said private line connection to be set, and using a band to be used for said prospective private line connection;
   a route information storage unit for storing route information on a route usable in said period of said private line connection; and
   a band information storage unit for storing using band information on a route usable in said period of said private line connection; and said control unit including:
   a public line connection setting command reception unit for receiving a public line connection setting command to set said public line connection,
   a reservation command reception unit for receiving a reservation command having said private line connection reservation information,
   a reservation information management unit for storing said private line connection reservation information received by said reservation command reception unit into said reservation information storage unit of said storage unit,
   a route deciding unit for deciding a route between said designated subscriber terminals usable in said period, based on said private line connection reservation information in said reservation information storage unit,
   a priority information management unit for setting said priority information to said route decided by said route deciding unit and storing route information on said route and said priority information into said priority information storage unit of said storage unit,
   a route information management unit for storing route information on a priority route to which said priority information is set by said priority information management unit into said route information storage unit of said storage unit, together with said period,
   a band information management unit for storing using band information said priority route into said band information storage unit of said storage unit, together with said period,
   a time information confirming unit for confirming said period by referring to said route information storage unit at constant time intervals, and
   a private line connection control unit for setting automatically a private line connection using said priority route and said using band between said designated subscriber terminals via said exchange switching unit when said time information confirming unit confirms the start time of said period, said private line connection control unit setting said public line connection between certain subscriber terminals without using said priority route, based on said priority route information in said priority information storing unit, when said public line connection setting command reception unit receives said public line connection setting command.

51. A private line connection controlling method in a fixed-length cell handling-type exchange including an exchange switching unit for setting a private line connection or a public line connection between a plurality of subscriber terminals and a control unit for controlling said exchange switching unit said method comprising the steps of receiving a setting command having private line connection reservation information by the exchange, said private line connection reservation information designating subscriber terminals between which a prospective private line connection is to be set, a period of said private line connection to be set, and using band for said prospective private line connection;

setting or canceling said private line connection between said designated subscriber terminals in accordance with said setting command having private line connection reservation information automatically with said control unit.

52. A fixed-length cell handling-type exchange comprising an exchange switching unit which accommodates a plurality of subscriber terminals, a control unit for controlling said exchange switching unit, and a storage unit for storing information for said control unit, said exchange being capable of setting a private line connection between specific subscriber terminals under control of said control unit;

said storage unit including:
   a reservation information storage unit for storing private line connection reservation information designating subscriber terminals to which said provide line connection is to be set or subscriber terminals from which already-set private line connection is to be canceled; and said control unit including:
   a command reception unit for receiving a command including said private line connection reservation information;
   a reservation information management unit for storing said private line connection reservation information received by said command reception unit into said reservation information storage unit of said storage unit, and
   a private line connection control unit for automatically controlling the setting or canceling of said private line connection between said designated subscriber terminals via said exchange switching unit in accordance with said private line connection reservation information in said command.

* * * * *